(12) United States Patent
Katsumata et al.

(10) Patent No.: US 10,730,434 B2
(45) Date of Patent: Aug. 4, 2020

(54) VEHICULAR DISPLAY CONTROL DEVICE, VEHICULAR DISPLAY SYSTEM, VEHICULAR DISPLAY CONTROL METHOD, AND NON-TRANSITORY STORAGE MEDIUM

(71) Applicant: JVC KENWOOD Corporation, Yokohama-shi, Kanagawa (JP)

(72) Inventors: Noboru Katsumata, Yokohama (JP); Izumi Saeki, Yokohama (JP); Hideaki Okamura, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 8 days.

(21) Appl. No.: 16/170,164

(22) Filed: Oct. 25, 2018

(65) Prior Publication Data

US 2019/0061624 A1 Feb. 28, 2019

Related U.S. Application Data

(63) Continuation of application No. PCT/JP2017/015014, filed on Apr. 12, 2017.

(30) Foreign Application Priority Data

Jul. 26, 2016 (JP) ................................ 2016-146001
Jul. 26, 2016 (JP) ................................ 2016-146504

(51) Int. Cl.
*H04N 7/18* (2006.01)
*B60R 1/00* (2006.01)
(Continued)

(52) U.S. Cl.
CPC ............ *B60R 1/00* (2013.01); *G06K 9/00798* (2013.01); *G06K 9/00805* (2013.01); *G06T 7/20* (2013.01);
(Continued)

(58) Field of Classification Search
CPC . B60R 1/00; B60R 2300/105; B60R 2300/30; B60R 2300/70
(Continued)

(56) References Cited

U.S. PATENT DOCUMENTS 6,476,731 B1 * 11/2002 Miki .................... B60Q 1/0023
340/435
8,736,665 B2 * 5/2014 Kawai ....................... B60R 1/00
348/39
(Continued)

FOREIGN PATENT DOCUMENTS

JP 02-041843 3/1990
JP 2005-346648 12/2005
(Continued)

OTHER PUBLICATIONS

International Search Report and Written Opinion for International Patent Application No. PCT/JP2017/015014 dated Jul. 11, 2017, 15 pages.

*Primary Examiner* — Gims S Philippe
(74) *Attorney, Agent, or Firm* — Amin, Turocy & Watson, LLP

(57) ABSTRACT

A vehicular display control device includes a rear video data acquiring unit configured to acquire rear video data from a rear camera disposed to face rear portion of a vehicle to capture rear view of the vehicle, a rear side video data acquiring unit configured to acquire rear side video data from rear side cameras disposed on right-side and left-side of the vehicle to face rear portion of the vehicle to capture rear right-side view and rear left-side view of the vehicle, a state detecting unit configured to detect surrounding state of the vehicle, a video synthesizing unit configured to, according to the surrounding state of the vehicle, synthesize the rear side video data in upper portion on right-side and left-side of the rear video data, and a display controller
(Continued)

configured to display the synthesized video data in a display for displaying the rear video data of the vehicle.

16 Claims, 26 Drawing Sheets

(51) Int. Cl.
| | | |
|---|---|---|
| G06K 9/00 | (2006.01) | |
| G06T 7/20 | (2017.01) | |
| G06T 7/50 | (2017.01) | |
| H04N 5/247 | (2006.01) | |
| H04N 5/265 | (2006.01) | |
| H04N 5/232 | (2006.01) | |
| H04N 5/445 | (2011.01) | |
| H04N 5/262 | (2006.01) | |

(52) U.S. Cl.
CPC ......... *G06T 7/50* (2017.01); *H04N 5/23238* (2013.01); *H04N 5/247* (2013.01); *H04N 5/265* (2013.01); *H04N 7/18* (2013.01); *H04N 7/181* (2013.01); *B60R 2300/105* (2013.01); *B60R 2300/30* (2013.01); *B60R 2300/70* (2013.01); *B60R 2300/802* (2013.01); *B60R 2300/8046* (2013.01); *B60R 2300/8066* (2013.01); *B60R 2300/8093* (2013.01); *G06K 2209/23* (2013.01); *G06T 2207/30252* (2013.01); *H04N 5/2628* (2013.01); *H04N 5/44504* (2013.01)

(58) Field of Classification Search
USPC .......................................................... 348/148
See application file for complete search history.

(56) References Cited

U.S. PATENT DOCUMENTS

| | | | |
|---|---|---|---|
| 10,293,750 B2* | 5/2019 | Brubaker | B60R 1/00 |
| 2007/0003108 A1* | 1/2007 | Chinomi | B60R 1/00 |
| | | | 382/104 |
| 2013/0054086 A1* | 2/2013 | Lo | B60R 1/00 |
| | | | 701/36 |
| 2014/0118551 A1 | 5/2014 | Ikeda et al. | |
| 2014/0247352 A1* | 9/2014 | Rathi | G06T 3/4038 |
| | | | 348/148 |
| 2017/0039434 A1 | 2/2017 | Shima et al. | |
| 2017/0066439 A1* | 3/2017 | Lee | B60G 17/0164 |
| 2017/0096106 A1* | 4/2017 | Higuchi | H04N 5/23293 |
| 2018/0229656 A1* | 8/2018 | Yokota | G08G 1/166 |

FOREIGN PATENT DOCUMENTS

| | | |
|---|---|---|
| JP | 2009-029203 | 2/2009 |
| JP | 2010-163104 | 7/2010 |
| JP | 2011-217318 | 10/2011 |
| JP | 2013-005232 | 1/2013 |
| JP | 2014-229101 | 12/2014 |
| JP | 2015-210592 | 11/2015 |
| JP | 2016-063352 | 4/2016 |
| JP | 2016-097896 | 5/2016 |

* cited by examiner

VEHICULAR DISPLAY CONTROL DEVICE, VEHICULAR DISPLAY SYSTEM, VEHICULAR DISPLAY CONTROL METHOD, AND NON-TRANSITORY STORAGE MEDIUM

CROSS-REFERENCE TO RELATED APPLICATIONS

This application is a continuation of International Application No. PCT/JP2017/015014, filed on Apr. 12, 2017 which claims the benefit of priority of the prior Japanese Patent Application No. 2016-146001, filed on Jul. 26, 2016 and Japanese Patent Application No. 2016-146504, filed on Jul. 26, 2016, the entire contents of which are incorporated herein by reference.

FIELD

The present application relates to a vehicular display control device, a vehicular display system, a vehicular display control method, and a non-transitory storage medium.

BACKGROUND

A technology related to what is called an electronic mirror is known for displaying videos acquired by a rear camera which captures the rear surrounding area of a vehicle. Unlike a conventional optical rearview mirror, an electronic mirror represents real images of two-dimensional videos. Hence, a driver may have difficulty to recognize a sense of distance to an object or feel strange. In this regard, an in-vehicle display device is known that can suppress erroneous recognition of the sense of distance between the vehicle and an object captured by a camera (for example, refer to Japanese Patent Application Laid-open No. 2016-063352). Moreover, a vehicle-rear recognition system is known that can resolve complications in a vision field adjustment and can display rear right-side and left-side videos without any strange feeling (for example, refer to Japanese Patent Application Laid-open No. 2011-217318).

SUMMARY

In order to check surroundings of a vehicle while driving, a driver visually confirms a rearview monitor as well as confirms a right sideview monitor and a left sideview monitor. Since the rearview monitor is installed apart from the right sideview monitor and the left sideview monitor, the driver must move his/her line of sight for checking the surroundings of the vehicle. Besides, there is only a limited volume of information that the driver can recognize within a short period of time while driving. For that reason, it is desirable that, when the driver needs information, videos with an appropriate volume of information are displayed in the rearview monitor as well as the right sideview monitor and the left sideview monitor. As described above, there has been a demand for a technology that enables appropriate checking of the surroundings of the vehicle.

A vehicular display control device, a vehicular display system, a vehicular display control method, and a non-transitory storage medium are disclosed.

According to one aspect, there is provided a vehicular display control device comprising: a rear video data acquiring unit configured to acquire rear video data from a rear camera which is disposed to face rear portion of a vehicle to capture rear view of the vehicle; a rear side video data acquiring unit configured to acquire rear side video data from rear side cameras which are disposed on right-side and left-side of the vehicle to face rear portion of the vehicle to capture rear right-side view and rear left-side view of the vehicle; a state detecting unit configured to detect a surrounding state of the vehicle; a video synthesizing unit configured to, according to the surrounding state of the vehicle detected by the state detecting unit, synthesize the rear side video data in upper portion on right-side and left-side of the rear video data which include no center portion thereof; and a display controller configured to display the synthesized video data obtained by the video synthesizing unit in a display for displaying the rear video data of the vehicle.

According to one aspect, there is provided a vehicular display control method comprising: acquiring rear video data from a rear camera which is disposed to face rear portion of a vehicle to capture rear view of the vehicle; acquiring rear side video data from rear side cameras which are disposed on right-side and left-side of the vehicle to face rear portion of the vehicle to capture rear right-side view and rear left-side view of the vehicle; detecting a surrounding state of the vehicle; synthesizing the rear side video data in upper portion on right-side and left-side of the rear video data which include no center portion thereof according to the detected surrounding state of the vehicle; and displaying the synthesized video data in a display for displaying the rear video data of the vehicle.

According to one aspect, there is provided a non-transitory storage medium that stores a program for causing a computer, which operates as a vehicular display control device, to execute: acquiring rear video data from a rear camera which is disposed to face rear portion of a vehicle to capture rear view of the vehicle; acquiring rear side video data from rear side cameras which are disposed on right-side and left-side of the vehicle to face rear portion of the vehicle to capture rear right-side view and rear left-side view of the vehicle; detecting a surrounding state of the vehicle; synthesizing the rear side video data in upper portion on right-side and left-side of the rear video data which include no center portion thereof according to the detected surrounding state of the vehicle; and displaying the synthesized video data in a display for displaying the rear video data of the vehicle.

The above and other objects, features, advantages and technical and industrial significance of this application will be better understood by reading the following detailed description of presently preferred embodiments of the application, when considered in connection with the accompanying drawings.

DETAILED DESCRIPTION OF THE PREFERRED EMBODIMENTS

Exemplary embodiments of a vehicular display control device 10, a vehicular display system 1, a vehicular display control method, and a non-transitory storage medium according to the present application are described below in detail with reference to the accompanying drawings. However, the present application is not limited by the embodiments described below.

First Embodiment

Figure 1:
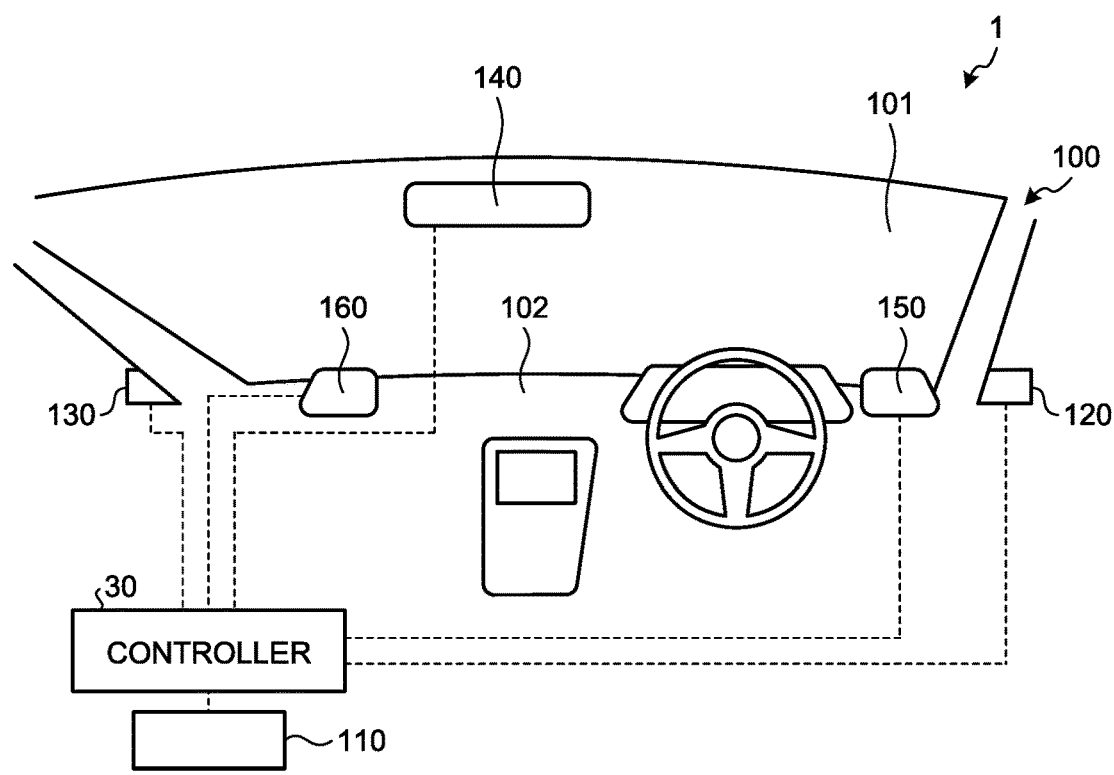
FIG. 1 is an outline drawing illustrating an exemplary configuration of a vehicular display system according to a first embodiment.
Figure 2:
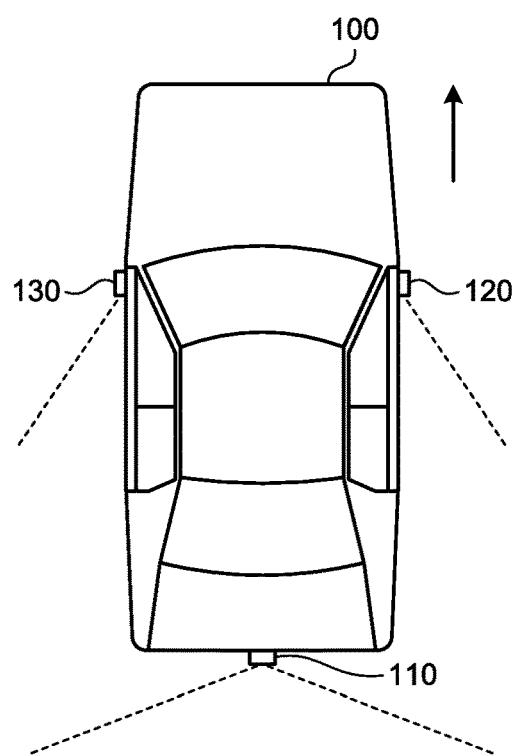
FIG. 2 is an outline drawing illustrating an exemplary configuration of the vehicular display system according to the first embodiment.
Figure 3:
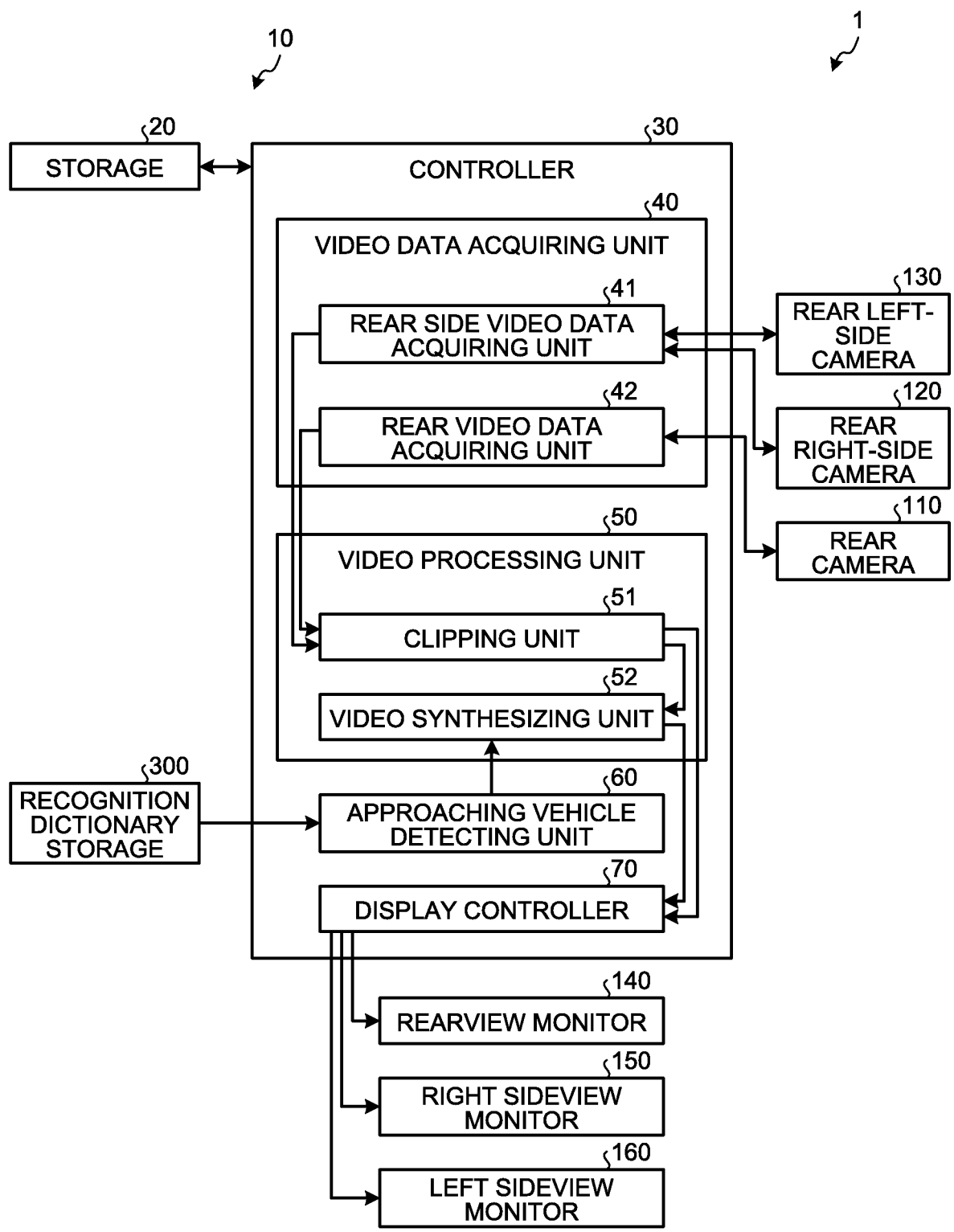
FIG. 3 is a block diagram illustrating an exemplary configuration of the vehicular display system according to the first embodiment.

The vehicular display system 1 for displaying surroundings of a vehicle is installed in the vehicle 100. FIG. 1 is an outline drawing illustrating an exemplary configuration of the vehicular display system according to a first embodiment. FIG. 2 is an outline drawing illustrating an exemplary configuration of the vehicular display system according to the first embodiment. FIG. 3 is a block diagram illustrating an exemplary configuration of the vehicular display system according to the first embodiment.

As illustrated in FIGS. 1 to 3, the vehicular display system 1 includes a rear camera 110, a rear right-side camera (a rear side camera) 120, a rear left-side camera (a rear side camera) 130, a rearview monitor (a display) 140, a right sideview monitor 150, a left sideview monitor 160, a recognition dictionary storage 300, and the vehicular display control device 10.

Figure 4:
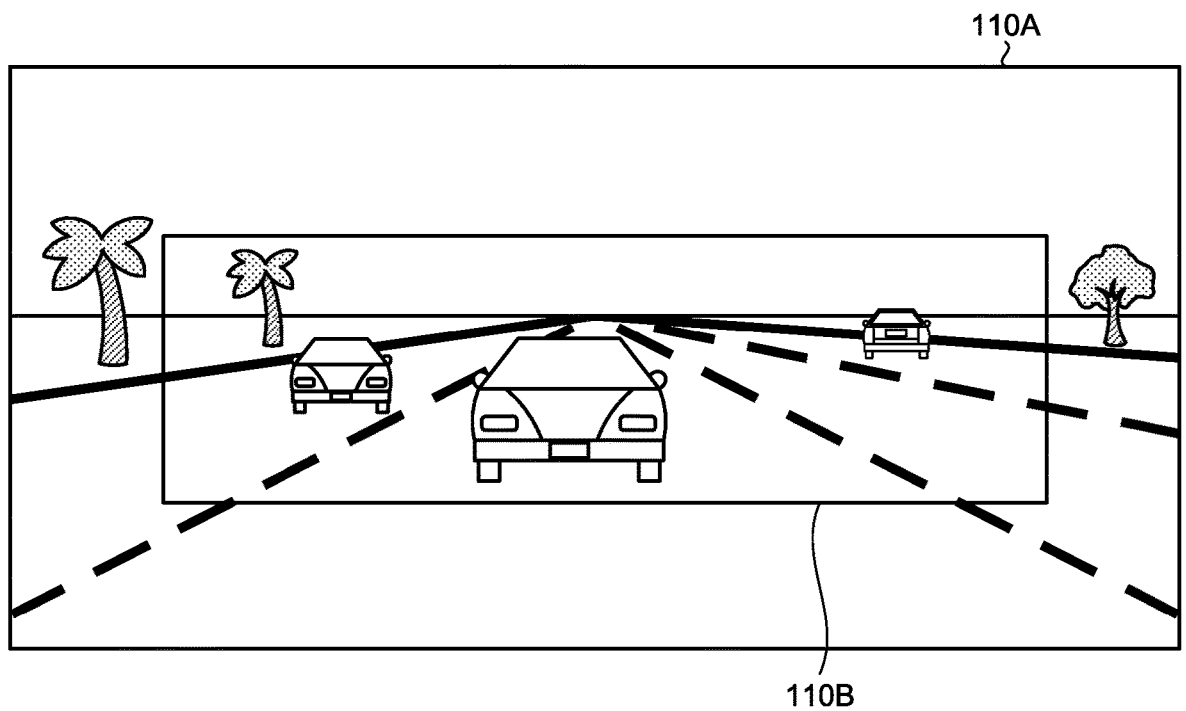
FIG. 4 is a diagram illustrating an example of video data captured by a rear camera of the vehicular display system according to the first embodiment.

The rear camera 110 is installed in a rear side of the vehicle with facing rearward for capturing a video of the rear side of the vehicle 100. The rear camera 110 has a horizontal angle of view in a range of, for example, 90° to 180° and has a vertical angle of view in a range of, for example, 45° to 90°. For example, the rear camera 110 captures first-type video data (rear video data) 110A as illustrated in FIG. 4. Herein, FIG. 4 is a diagram illustrating an example of video data captured by the rear camera of the vehicular display system according to the first embodiment. The rear camera 110 is capable of capturing video of a wider range than the displayable range of the rearview monitor 140. Thus, the range which the driver of the vehicle 100 can appropriately check the rear side using the rearview monitor 140 is clipped and displayed in the rearview monitor 140. Then, the rear camera 110 outputs the first-type video data 110A to a rear video data acquiring unit 42 of a video data acquiring unit 40 in the vehicular display control device 10.

The rear right-side camera 120 is installed in the right-side of the vehicle 100 with facing rearward to capture the right-side part of the vehicle 100. The rear right-side camera 120 captures a range equivalent to a confirmation range of the right sideview monitor 150. The rear right-side camera 120 has a horizontal angle of view in a range of, for example, 15° to 45° and has a vertical angle of view in a range of, for example, 15° to 45°. Moreover, the rear right-side camera 120 can be freely tilted. The rear right-side camera 120 outputs the captured video (rear side video data) to a rear side video data acquiring unit 41 of the video data acquiring unit 40 in the vehicular display control device 10.

The rear left-side camera 130 is installed in the left-side of the vehicle 100 with facing rearward to capture the left-side part of the vehicle 100. The rear left-side camera 130 captures the range equivalent to the confirmation range of the left sideview monitor 160. The rear left-side camera 130 has the horizontal angle of view in the range of, for example, 15° to 45° and has the vertical angle of view in the range of, for example, 15° to 45°. Moreover, the rear left-side camera 130 can be freely tilted. The rear left-side camera 130 outputs the captured video (rear side video data) to the rear side video data acquiring unit 41 of the video data acquiring unit 40 in the vehicular display control device 10.

Figure 5:
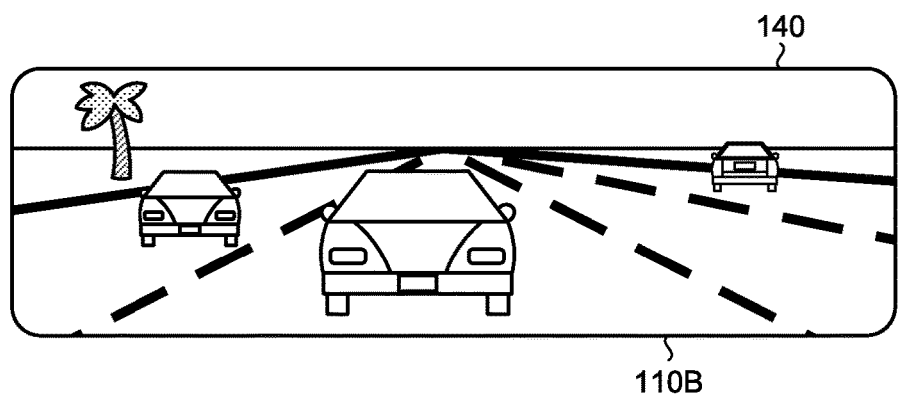
FIG. 5 is a diagram illustrating an example of a video displayed in a rearview monitor of the vehicular display system according to the first embodiment.

The rearview monitor 140 is an electronic rearview mirror, for example. In a case of using the rearview monitor 140 as an electronic rearview mirror, it does not matter whether or not a half mirror is provided for checking the rear part according to optical reflection. For example, the rearview monitor 140 is a display including a liquid crystal display (LCD) or an Organic EL (Organic Electro-Luminescence) display. The rearview monitor 140 displays a rear video of the vehicle 100 based on a video signal output from a display controller 70 of the vehicular display control device 10. More specifically, a rear video as illustrated in FIG. 5 is displayed in the rearview monitor 140. FIG. 5 is a diagram illustrating an example of the video displayed in the rearview monitor of the vehicular display system according to the first embodiment. The rearview monitor 140 is disposed at an easily-viewable position for the driver. In the first embodiment, the rearview monitor 140 is positioned in an upper part of center in the vehicle width direction of a windshield 101. Alternatively, the rearview monitor 140 can be incorporated into a dashboard 102 or a headliner.

There is no restriction on a size and a shape of the rearview monitor 140. For example, the size and the shape of the rearview monitor 140 can be identical to the size and the shape of a conventional optical rearview mirror. Alternatively, for example, the rearview monitor 140 can be wider in the vehicle width direction as compared to the conventional optical rearview mirror. Still alternatively, for example, the rearview monitor 140 can be wider in the vertical direction as compared to the conventional optical rearview mirror.

Figure 6:
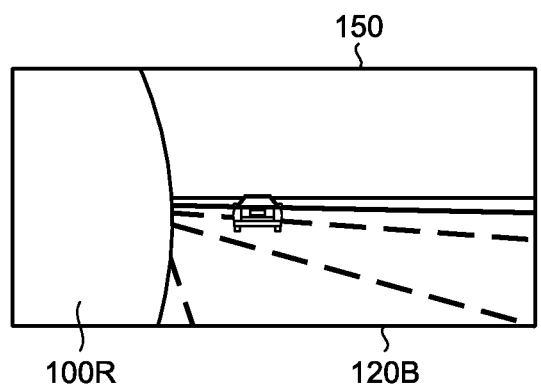
FIG. 6 is a diagram illustrating an example of a video displayed in a right sideview monitor of the vehicular display system according to the first embodiment.

The right sideview monitor 150 is, for example, a display including a liquid crystal display or an organic EL display. The right sideview monitor 150 displays a right-side rear video of the vehicle 100 based on a video signal output from the display controller 70 of the vehicular display control device 10. More specifically, the right sideview monitor 150 displays a right-side rear video as illustrated in FIG. 6. Herein, FIG. 6 is a diagram illustrating an example of the video displayed in the right sideview monitor of the vehicular display system according to the first embodiment. In the right sideview monitor 150, a right-side vehicle body 100R of the vehicle 100 is displayed. The right sideview monitor 150 is disposed at an easily-viewable position for the driver. In the first embodiment, the right sideview monitor 150 is positioned on the right-side in the vehicle width direction of the dashboard 102.

Figure 7:
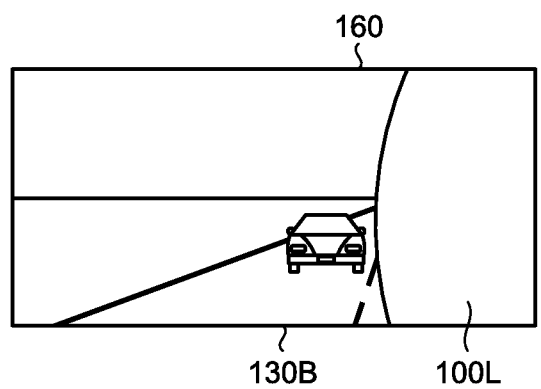
FIG. 7 is a diagram illustrating an example of a video displayed in a left sideview monitor of the vehicular display system according to the first embodiment.

The left sideview monitor 160 is, for example, a display including a liquid crystal display or an organic EL display. The left sideview monitor 160 displays a left-side rear video of the vehicle 100 based on a video signal output from the display controller 70 of the vehicular display control device 10. For example, the left sideview monitor 160 displays a left-side rear\video as illustrated in FIG. 7. Herein, FIG. 7 is a diagram illustrating an example of the video displayed in the left sideview monitor of the vehicular display system according to the first embodiment. In the left sideview monitor 160, a left-side vehicle body 100L of the vehicle 100 is displayed. The left sideview monitor 160 is disposed at an easily-viewable position for the driver. In the first embodiment, the left sideview monitor 160 is positioned on the left-side in the vehicle width direction of the dashboard 102.

The recognition dictionary storage 300 is used to store, for example, a recognition dictionary for enabling collation of patterns such as shapes, sizes, and colors of a front view of the vehicle 100. Examples of the recognition dictionary storage 300 include a semiconductor flash memory such as a RAM (Random Access Memory), a ROM (Read Only Memory), or a flash memory; and a memory device such as a hard disc, an optical disc, or an external memory device connected via a network.

Returning to the explanation with reference to FIG. 3, the vehicular display control device 10 includes a storage 20 and a controller 30.

The storage 20 is used to store data required in various processes performed in the vehicular display control device 10, and to store various processing results. Examples of the storage 20 include a semiconductor memory device such as a RAM, a ROM, or a flash memory; a hard disk; an optical disk; and an external memory device connected via a network. Alternatively, the storage 20 can be an external memory device that is wirelessly connected via a communication device (not illustrated).

Examples of the controller 30 include an arithmetic processing unit configured with a CPU (Central Processing Unit). The controller 30 includes the video data acquiring unit 40; a video processing unit 50; an approaching vehicle detecting unit 60 that detects a surrounding state of the vehicle as a state detecting unit; and the display controller 70. The controller 30 executes commands written in computer programs that are stored in the storage 20.

The video data acquiring unit 40 acquires videos in which the rear part and the rear side parts of the vehicle 100 are captured. For example, the video data that is acquired by the video data acquiring unit 40 represents, for example, data of a video in which images having 60 frames per second are successively captured. The video data acquiring unit 40 includes the rear side video data acquiring unit 41 and the rear video data acquiring unit 42. The rear side video data acquiring unit 41 acquires second-type video data output by the rear right-side camera 120 and the rear left-side camera 130. Then, the rear side video data acquiring unit 41 outputs the acquired second-type video data to a clipping unit 51. The rear video data acquiring unit 42 acquires first-type video data 110A output by the rear camera 110. Then, the rear video data acquiring unit 42 outputs the acquired first-type video data 110A to the clipping unit 51.

The clipping unit 51 clips, from the first-type video data 110A, rear video data 110B for the rearview monitor 140. Herein, the clipping unit 51 clips some portion of the first-type video data 110A. The clipping range to be clipped from the first-type video data 110A is registered in advance. In the first embodiment, the central portion of the first-type video data 110A is clipped. Then, the clipping unit 51 outputs the clipped rear video data 110B to a video synthesizing unit 52 and the display controller 70.

Moreover, the clipping unit 51 clips, from the second-type video data, rear right-side video data 120B and rear left-side video data 130B for with the right sideview monitor 150 and the left sideview monitor 160 respectively. Herein, the rear video data 110B, the rear right-side video data 120B, and the rear left-side video data 130B that are clipped by the clipping unit 51 are in synchronization in time with each other.

Figure 8:
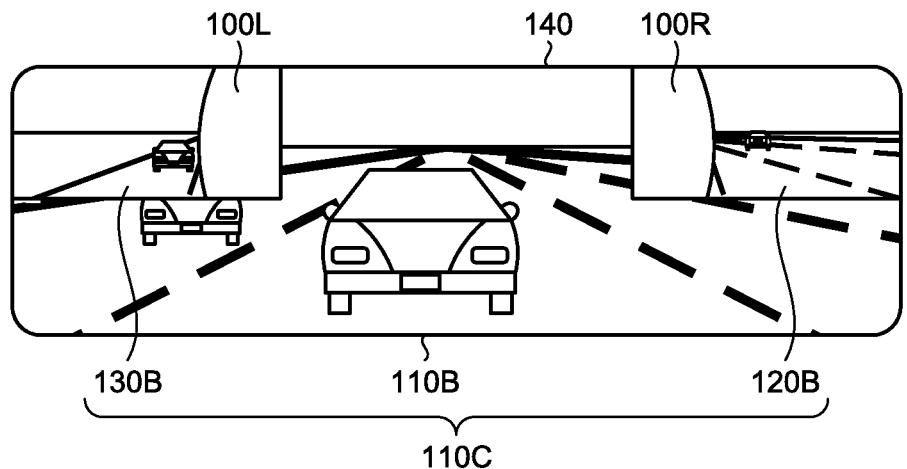
FIG. 8 is a diagram illustrating another example of the video displayed in the rearview monitor of the vehicular display system according to the first embodiment.

According to a detection result by the approaching vehicle detecting unit 60, the video synthesizing unit 52 synthesizes the rear right-side video data 120B and the rear left-side video data 130B in an upper portion on the right-side and the left-side of the rear video data 110B respectively to generate rear video data 110C. In the first embodiment, when the approaching vehicle detecting unit 60 detects at least one or another (hereinafter called another) vehicle coming close from behind the vehicle 100, the video synthesizing unit 52 synthesizes the rear right-side video data 120B and the rear left-side video data 130B in the upper portion on the right-side and the left-side of the rear video data 110B respectively to generate the rear video data 110C. For example, the video synthesizing unit 52 generates the rear video data 110C by performing image synthesis in a manner illustrated in FIG. 8. Herein, FIG. 8 is a diagram illustrating another example of the video displayed in the rearview monitor of the vehicular display system according to the first embodiment. In the first embodiment, in the synthesized rear video data 110C, a vertical size of the rear right-side video data 120B and the rear left-side video data 130B is about half of the upper part of a vertical size of the display screen of the rearview monitor 140. Moreover, in the synthesized rear video data 110C, a horizontal size of the rear right-side video data 120B and the rear left-side video data 130B is about one-third of a horizontal size of the display screen of the rearview monitor 140. The video synthesizing unit 52 outputs the synthesized rear video data 110C to the display controller 70.

In the rear video data 110B, a range of a central portion and ranges of a right lower portion and a left lower portion thereof represent ranges with a high degree of necessity for safety confirmation to be performed by the driver while driving. The central portion of the rear video data 110B includes a vanishing point when a travelling path goes straight ahead. In other words, in the rear video data 110B, ranges of a right upper portion and a left upper portion has a low degree of necessity for safety confirmation to be performed by the driver while driving. For that reason, the video synthesizing unit 52 synthesizes the rear right-side video data 120B and the rear left-side video data 130B in the upper portion on the right-side and the left-side of the rear video data 110B respectively. In the first embodiment, in the synthesized rear video data 110C, the vertical size of the rear right-side video data 120B and the rear left-side video data 130B is about half of the upper part of the vertical size of the display screen of the rearview monitor 140, so that overlapping ranges of the videos are reduced. Moreover, in the first embodiment, in the synthesized rear video data 110C, the horizontal size of the rear right-side video data 120B and the rear left-side video data 130B is about one-third on the right-side and the left-side of the horizontal size of the display screen of the rearview monitor 140, so that the overlapping ranges of the videos are reduced. In order to clear a boundary between the rear video data 110B and the rear right-side video data 120B and a boundary between the rear video data 110B and the rear left-side video data 130B, it is effective to use frame borders for enclosing the rear right-side video data 120B and the rear left-side video data 130B.

The approaching vehicle detecting unit 60 detects, from the rear video data 110B, other vehicles coming close from behind the vehicle 100. The approaching vehicle detecting unit 60 performs a vehicle recognition process on the rear video data 110B, and detects other vehicles coming close from behind the vehicle 100. More specifically, the approaching vehicle detecting unit 60 performs a pattern matching on the rear video data 110B using the recognition dictionary stored in the recognition dictionary storage 300, and detects presence of other vehicles coming close from behind the vehicle 100. Moreover, the approaching vehicle detecting unit 60 performs image processing and tracks the detected other vehicles. Then, the approaching vehicle detecting unit 60 outputs the detection result to the video synthesizing unit 52.

When a plurality of other vehicles is detected in the rear video data 110B, the approaching vehicle detecting unit 60 can detect, among the detected other vehicles, the other vehicles that have come closest to the vehicle 100 on the right-side and the left-side of the rear video data 110B. For example, on the right-side as well as the left-side of the rear video data 110B, as another vehicle having the shortest distance to the vehicle 100, the approaching vehicle detecting unit 60 can detect another vehicle having the lowest position in the rear video data 110B among the detected other vehicles.

The display controller 70 outputs, to the rearview monitor 140 on a frame-by-frame basis or after each predetermined number of frames, either the rear video data 110B or the rear synthesized video data 110C acquired by the video synthesizing unit 52.

The display controller 70 displays, on a frame-by-frame basis or after each predetermined number of frames, the rear right-side video data 120B in the right sideview monitor 150. In other words, the display controller 70 displays, in the right sideview monitor 150, the rear right-side video data 120B that is based on the second-type video data captured by the rear right-side camera 120.

Moreover, the display controller 70 displays, on a frame-by-frame basis or after each predetermined number of frames, the rear left-side video data 130B in the left sideview monitor 160. In other words, the display controller 70 displays, in the left sideview monitor 160, the rear left-side video data 130B that is based on the second-type video data captured by the rear left-side camera 130. Herein, the display controller 70 controls the display so as to synchronize the rear video data 110B or the synthesized rear video data 110C that is displayed in the rearview monitor 140 with the rear right-side video data 120B displayed in the right sideview monitor 150 and the rear left-side video data 130B displayed in the left sideview monitor 160 in time.

Figure 9:
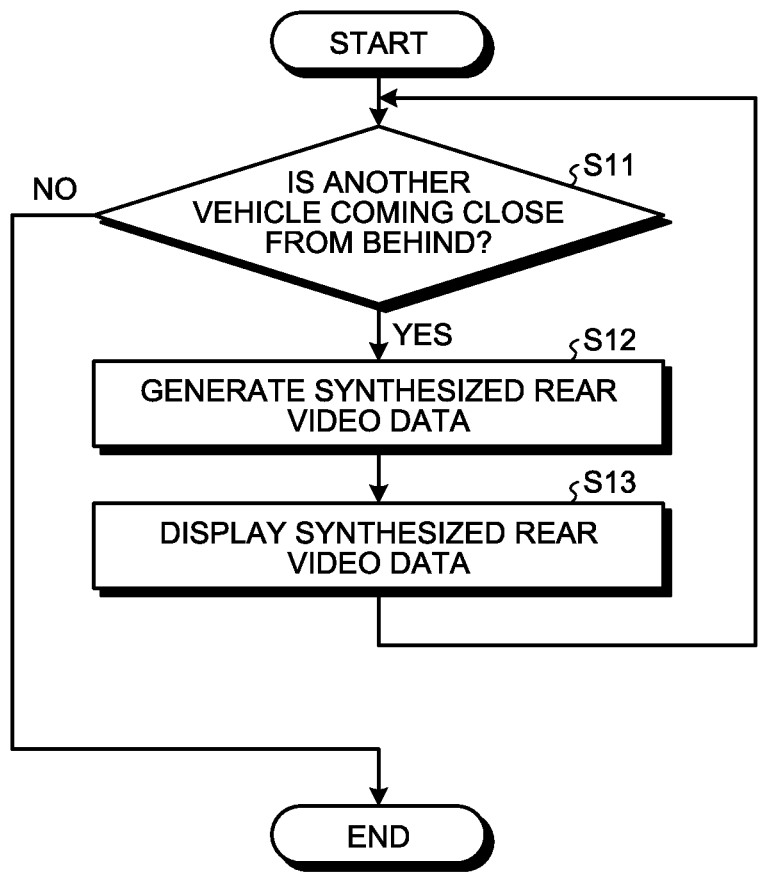
FIG. 9 is a flowchart for explaining a flow of processes performed in a controller of a vehicular display control device in the vehicular display system according to the first embodiment.

Explained below with reference to FIG. 9 is a information processing performed in the controller 30. FIG. 9 is a flowchart for explaining a flow of processes performed in the controller of the vehicular display control device in the vehicular display system according to the first embodiment.

The premise for the processes illustrated in FIG. 9 is that, while the vehicle 100 is in operation, the rear video data 110B is displayed in the rearview monitor 140, the rear right-side video data 120B is displayed in the right sideview monitor 150, and the rear left-side video data 130B is displayed in the left-sideview monitor 160. Moreover, in such a state, the controller 30 continues detecting other vehicles coming close from behind. More specifically, the approaching vehicle detecting unit 60 of the controller 30 constantly detects other vehicles on the rear video data 110B.

The controller 30 determines the presence or absence of another vehicle coming close from behind (Step S11). More specifically, based on the detection result obtained by the approaching vehicle detecting unit 60, the controller 30 determines whether or not another vehicle coming close from behind the vehicle 100 has been detected. For example, if a size in the vehicle width direction of the other vehicle detected by the approaching vehicle detecting unit 60 is equal to or greater than a predetermined percentage of the size in the width direction of the rear video data 110B, or if the number of pixels in the vehicle width direction of the other vehicle is equal to or greater than a predetermined percentage of the number of pixels in the width direction of the rear video data 110B, then the controller 30 determines that the other vehicle is coming close to the vehicle 100. Meanwhile, the predetermined percentage for determining whether or not another vehicle has come close to the vehicle 100 can be varied according to a type of the other vehicle. If it is determined that no other vehicle has come close from behind (No at Step S11), then the controller 30 ends the processes. Herein, ending the processes implies continuing a state in which the rear video data 110B is displayed in the rearview monitor 140, the right-size rear video data 120B is displayed in the right sideview monitor 150, and the rear left-side video data 130B is displayed in the left sideview monitor 160. On the other hand, if it is determined that another vehicle has come close from behind (Yes at Step S11), then the system control proceeds to Step S12.

At Step S11, when it is determined that another vehicle has come close from behind, the controller 30 generates the synthesized rear video data 110C (Step S12). More specifically, the controller 30 makes the clipping unit 51 clip the rear video data 110B from the first-type video data 110A. Then, the controller 30 makes the video synthesizing unit 52 generate the rear video data 110C by synthesizing the rear right-side video data 120B and the rear left-side video data 130B in the upper portion on the right-side and the left-side of the rear video data 110B respectively.

Subsequently, the controller 30 displays the synthesized rear video data 110C generated at Step S12 (Step S13). More specifically, the controller 30 displays either the usual rear video data 110B or the synthesized rear video data 110C in the rearview monitor 140.

Meanwhile, even after the determination at Step S11 that another vehicle has come close from behind, the approaching vehicle detecting unit 60 continues detecting other vehicles. More specifically, the controller 30 continues detecting other vehicles using the approaching vehicle detecting unit 60.

At Step S13, while the synthesized rear video data 110C is displayed, the controller 30 continually determines about the presence or absence of other vehicles coming close from behind based on the detection result obtained by the approaching vehicle detecting unit 60. As a result of this process, the processes at Steps S12 and S13 are performed on a continuing basis when the approaching other vehicle detected at Step S11 is still coming closer or when a new approaching other vehicle is detected.

The controller 30 performs the determination at Step S11 at predetermined intervals of, for example, 0.5 seconds. When it is determined that some other vehicle has come close from behind (Yes at Step S11), the controller 30 performs the processes at Steps S12 and S13 for the videos of all frames captured by the rear camera 110, the rear right-side camera 120, and the rear left-side camera 130 until it is determined that no other vehicle is coming close from behind (No at Step S11).

In this way, in the vehicular display system 1, when another vehicle coming close from behind is detected, the synthesized rear video data 110C is displayed in the rearview monitor 140.

As described above, in the first embodiment, when the approaching vehicle detecting unit 60 detects another vehicle coming close from behind, the rear video data 110C that is generated by synthesizing the rear right-side video data 120B and the rear left-side video data 130B in the upper portion on the right-side and the left-side of the rear video data 110B respectively is displayed in the display screen of the rearview monitor 140. As a result, in the first embodiment, when another vehicle coming close from behind is detected, the rear view and the rear right-side view and left-side view of the vehicle 100 can be checked in the display screen of the rearview monitor 140. Thus, according to the first embodiment, it becomes possible to suppress movement of line of sight of the driver. More specifically, according to the first embodiment, the rear right-side view and the rear left-side view can be checked even without moving the line of sight from the rearview monitor 140 for visually confirming the right sideview monitor 150 and the left sideview monitor 160. Thus, according to the first embodiment, it becomes possible to shorten time required by the driver to check the rear view, the rear right-side view and the rear left-side view of the vehicle 100. In this way, the vehicular display system 1 enables appropriate checking of the surroundings of the vehicle 100.

According to the first embodiment, when another vehicle coming close from behind is detected, the synthesized rear video data 110C is displayed in the display screen of the rearview monitor 140. As a result, according to the first embodiment, the rear view of the vehicle 100 as well as the rear right-side view and the rear left-side view of the vehicle 100 can be automatically displayed in the display screen of the rearview monitor 140 regardless of any operation performed by the driver. In this way, the vehicular display system 1 enables appropriate checking of the surroundings of the vehicle 100.

According to the first embodiment, when another vehicle coming close from behind is detected, the synthesized rear video data 110C is displayed in the display screen of the rearview monitor 140. According to the first embodiment, in other cases, the rear video data 110B is displayed. Thus, according to the first embodiment, when another vehicle coming close from behind is detected, videos having an appropriate volume of information can be displayed at a timing at which the driver needs information.

According to the first embodiment, the video synthesizing unit 52 synthesizes the rear right-side video data 120B and the rear left-side video data 130B in the upper portion on the right-side and the left-side of the rear video data 110B respectively. In other words, according to the first embodiment, the video synthesizing unit 52 reduces the overlapping range of the rear right-side video data 120B and the rear left-side video data 130B in a range below the vanishing point of the rear video data 110B. In other words, the upper portion on the right-side and the left-side of the rear video data 110B has low priority for rear confirmation during the backward movement, and the confirmation according to the rear right-side video data 120B and the rear left-side video data 130B is more appropriate. Hence, according to the first embodiment, the rear view in the range with the high degree of necessity for safety confirmation to be performed by the driver while driving can be checked just like a conventional optical rearview mirror regardless of the presence or absence of another vehicle coming close from behind.

According to the first embodiment, when another vehicle coming close from behind is detected, the synthesized rear video data 110C is displayed in the display screen of the rearview monitor 140. In this way, in the first embodiment, when another vehicle coming close from behind is detected, there is a change in the video displayed in the display screen of the rearview monitor 140, thereby making it easy to recognize that another vehicle is coming close from behind.

Second Embodiment

Figure 10:
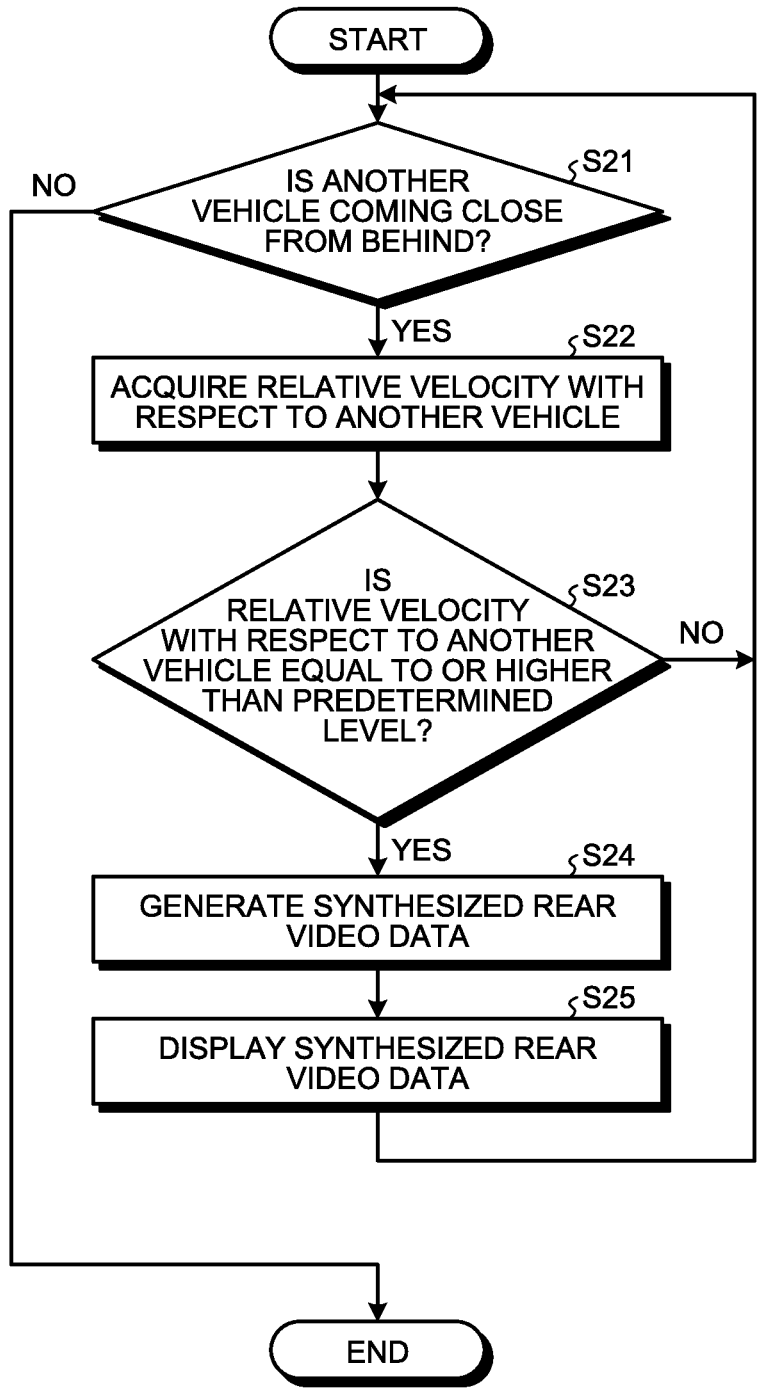
FIG. 10 is the flowchart for explaining the flow of processes performed in the controller of the vehicular display control device in the vehicular display system according to a second embodiment.

Explained below with reference to FIG. 10 is the vehicular display system 1 according to a second embodiment. FIG. 10 is a flowchart for explaining a flow of processes performed in the controller of the vehicular display control device in the vehicular display system according to the second embodiment. The vehicular display system 1 according to the second embodiment has an identical fundamental configuration to the configuration of the vehicular display system 1 according to the first embodiment. In the following explanation, the identical constituent elements to those of the vehicular display system 1 according to the first embodiment are referred to by the same or equivalent reference numerals, and their detailed explanation is not given again. In the vehicular display system 1 according to the second embodiment, the information processing performed in the controller 30 is different from the information processing performed in the vehicular display system 1 according to the first embodiment.

The approaching vehicle detecting unit 60 detects the relative velocity of another vehicle coming close from behind the vehicle 100 with respect to the vehicle 100. The relative velocity of another vehicle coming close from behind the vehicle 100 with respect to the vehicle 100 can be calculated based on, for example, a change, on the frame-by-frame basis, in a size of another vehicle in the first-type video data 110A.

The following explanation is given about the information processing performed in the controller 30. With reference to the flowchart illustrated in FIG. 10, the processes performed at Steps S21, S24, and S25 are identical to the processes performed at Steps S11, S12, and S13, respectively, illustrated in the flowchart in FIG. 9.

The controller 30 acquires a relative velocity with respect to another vehicle (Step S22). More specifically, the controller 30 makes the approaching vehicle detecting unit 60 detect the relative velocity of another vehicle coming close from behind the vehicle 100 with respect to the vehicle 100.

The controller 30 determines whether or not the relative velocity is equal to or higher than a predetermined level (Step S23). More specifically, based on the relative velocity with respect to another vehicle acquired by the approaching vehicle detecting unit 60, the controller 30 determines whether or not the relative velocity with respect to the other vehicle coming close from behind the vehicle 100 is equal to or higher than a predetermined level. Regarding the relative velocity of another vehicle with respect to the vehicle 100, the threshold value can be set in a stepwise manner according to the travelling speed of the vehicle 100. In the second embodiment, when the travelling speed is slower than 60 km/h, the threshold value of the relative velocity of another vehicle with respect to the vehicle 100 is set to 5 km/h. When the travelling speed is 60 km/h or higher, the threshold value of the relative velocity of another vehicle with respect to the vehicle 100 is set to 10 km/h. If it is determined that the relative velocity with respect to another vehicle coming close from behind is lower than the predetermined level (No at Step S23), the controller 30 again performs the operation at Step S21. Even when it is determined that the relative velocity is lower than the predetermined level (No at Step S23) based on the detection result detected by the approaching vehicle detecting unit 60, the controller 30 continues determining the presence or absence of another vehicle coming close from behind. As a result of this process, it becomes possible to also deal with a case in which the approaching vehicle detected at Step S21 is still coming closer or a case in which a new approaching vehicle is detected. Meanwhile, if it is determined that the relative velocity with respect to another vehicle coming close from behind is equal to or higher than the predetermined level (Yes at Step S23), then the system control proceeds to Step S24.

In this way, in the vehicular display system 1, when the relative velocity of the vehicle 100 with respect to another vehicle coming close from behind is equal to or higher than the predetermined level, the synthesized rear video data 110C is displayed in the display screen of the rearview monitor 140.

As described above, in the second embodiment, when the relative velocity of the vehicle 100 with respect to another vehicle coming close from behind is equal to or greater than the predetermined level, the rear right-side video data 120B and the rear left-side video data 130B are synthesized in the upper portion on the right-side and the left-side of the rear video data 110B respectively, and the synthesized rear video data 110C is displayed in the display screen of the rearview monitor 140. As a result, according to the second embodiment, when the relative velocity of the vehicle 100 with respect to another vehicle coming close from behind is equal to or greater than the predetermined level, the rear view of the vehicle 100 as well as the rear right-side view and the rear left-side view of the vehicle 100 can be checked in the display screen of the rearview monitor 140. Thus, according to the second embodiment, it becomes possible to suppress the movement of the line of sight of the driver. Thus, according to the second embodiment, it becomes possible to shorten the time required by the driver to check the rear view, the rear right-side view, and the rear left-side view of the vehicle 100. In this way, the vehicular display system 1 enables appropriate checking of the surroundings of the vehicle 100.

Third Embodiment

Figure 11:
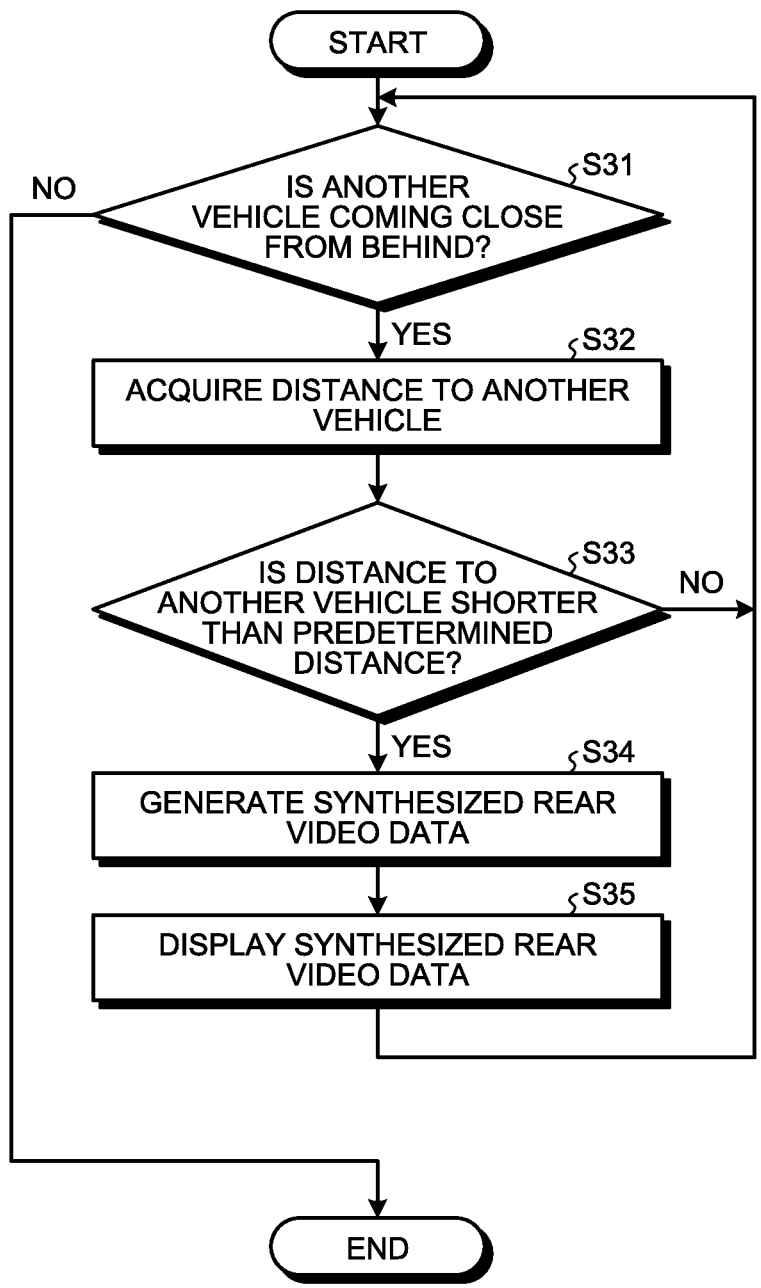
FIG. 11 is the flowchart for explaining the flow of processes performed in the controller of the vehicular display control device in the vehicular display system according to a third embodiment.

Explained below with reference to FIG. 11 is the vehicular display system 1 according to a third embodiment. FIG. 11 is a flowchart for explaining a flow of processes performed in the controller of the vehicular display control device in the vehicular display system according to the third embodiment. In the vehicular display system 1 according to the third embodiment, the information processing performed in the controller 30 is different from the information processing performed in the vehicular display system 1 according to the first embodiment.

The approaching vehicle detecting unit 60 detects the distance between the vehicle 100 and another vehicle coming close from behind the vehicle 100. The distance between the vehicle 100 and another vehicle coming close from behind the vehicle 100 can be calculated based on, for example, the size of another vehicle in the first-type video data 110A and the sizes of rear mobile objects stored in the recognition dictionary storage 300.

The following explanation is given about the information processing performed in the controller 30. With reference to the flowchart illustrated in FIG. 11, the processes performed at Steps S31, S34, and S35 are identical to the processes performed at Steps S11, S12, and S13 respectively, illustrated in the flowchart in FIG. 9.

The controller 30 acquires the distance to another vehicle (Step S32). More specifically, the controller 30 make the approaching vehicle detecting unit 60 detect the distance between the vehicle 100 and another vehicle coming close from behind the vehicle 100.

The controller 30 determines whether or not the distance between another vehicle and the vehicle 100 is shorter than a predetermined distance (Step S33). More specifically, based on the distance to another vehicle acquired by the approaching vehicle detecting unit 60, the controller 30 determines whether or not the distance between the vehicle 100 and another vehicle coming close from behind the vehicle 100 is shorter than the predetermined distance. Regarding the distance between another vehicle and the vehicle 100, the threshold value can be set in a stepwise manner according to the travelling speed of the vehicle 100. In the third embodiment, when the travelling speed is slower than 60 km/h, the threshold value of the distance between another vehicle and the vehicle 100 is set to 10 m. When the travelling speed is 60 km/h or higher, the threshold value of the distance between another vehicle and the vehicle 100 is set to 20 m. If the distance between another vehicle coming close from behind and the vehicle 100 is equal to or greater than the predetermined distance (No at Step S33), then the controller 30 again performs the process at Step S31. Even when the distance between another vehicle coming close from behind and the vehicle 100 is equal to or greater than the predetermined distance (No at Step S33) based on the detection result obtained by the approaching vehicle detecting unit 60, the controller 30 continues determining determination the presence or absence of another vehicle coming close from behind. As a result of this process, it becomes possible to also deal with a case in which the approaching vehicle detected at Step S31 is still coming closer or a case in which a new approaching vehicle is detected. Meanwhile, if it is determined that the distance between another vehicle coming close from behind and the vehicle 100 is shorter than the predetermined distance (Yes at Step S33), then the system control proceeds to Step S34.

In this way, in the vehicular display system 1, when the distance between another vehicle coming close from behind and the vehicle 100 is shorter than the predetermined distance, the synthesized rear video data 110C is displayed in the display screen of the rearview monitor 140.

In this way, in the third embodiment, when the distance between another vehicle coming close from behind and the vehicle 100 is shorter than the predetermined distance, the rear right-side video data 120B and the rear left-side video data 130B is synthesized in the upper portion on the right-side and the left-side of the rear video data 110B respectively, and the synthesized rear video data 110C is displayed in the display screen of the rearview monitor 140. As a result, according to the third embodiment, when the distance between another vehicle coming close from behind and the vehicle 100 is shorter than the predetermined distance, the rear view of the vehicle 100 as well as the rear right-side view and the rear left-side view of the vehicle 100 can be checked in the display screen of the rearview monitor 140. Thus, according to the third embodiment, it becomes possible to suppress the movement of the line of sight of the driver. Thus, according to the third embodiment, it becomes possible to shorten the time required by the driver to check the rear view, the rear right-side view and the rear left-side view of the vehicle 100. In this way, the vehicular display system 1 enables appropriate checking of the surroundings of the vehicle 100.

Fourth Embodiment

Figure 12:
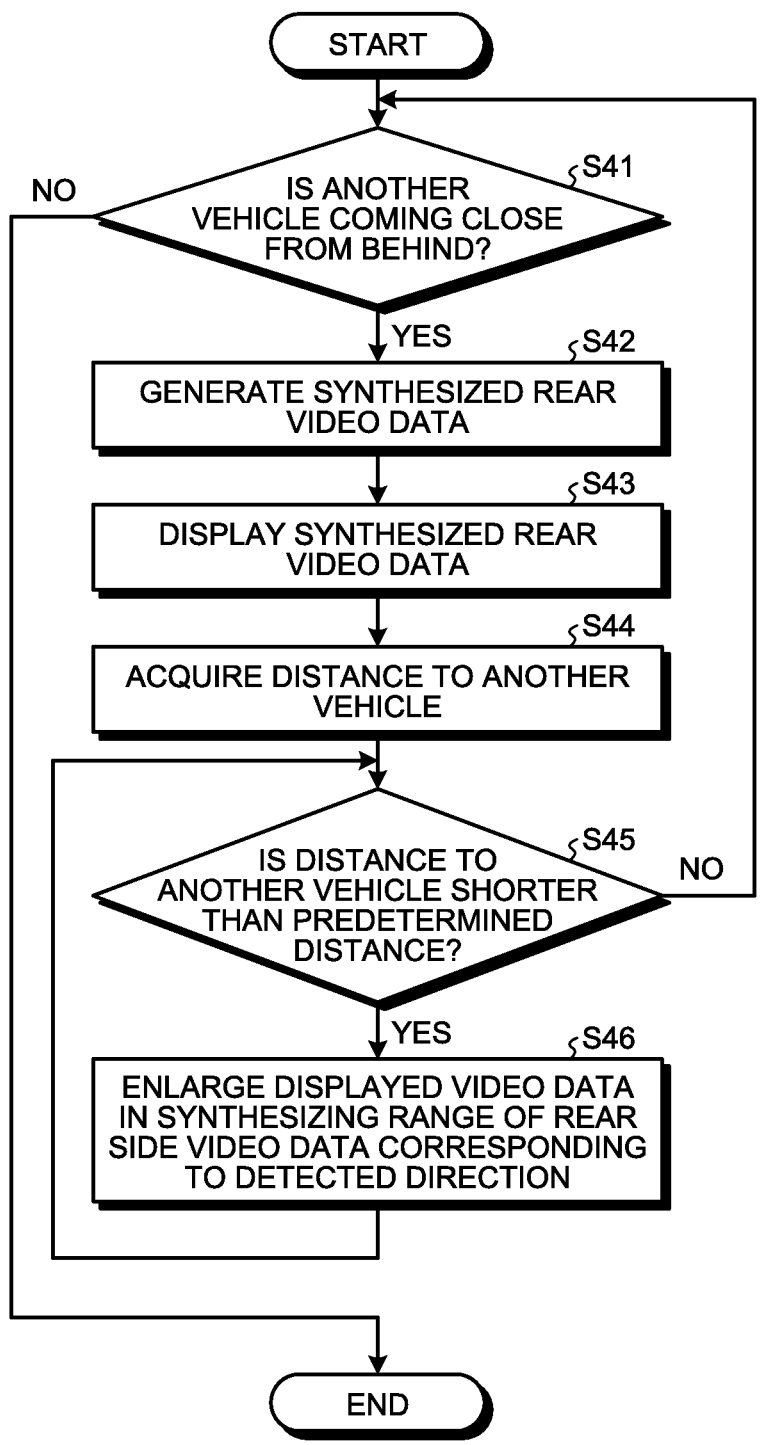
FIG. 12 is the flowchart for explaining the flow of processes performed in the controller of the vehicular display control device in the vehicular display system according to a fourth embodiment.
Figure 13:
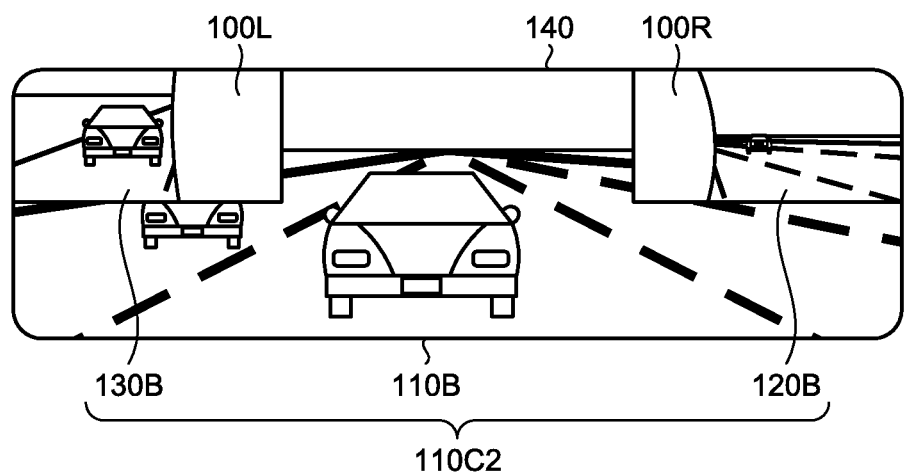
FIG. 13 is a diagram illustrating an example of the video displayed in the rearview monitor of the vehicular display system according to the fourth embodiment.

Explained below with reference to FIGS. 12 and 13 is the vehicular display system 1 according to a fourth embodiment. FIG. 12 is a flowchart for explaining a flow of processes performed in the controller of the vehicular display control device in the vehicular display system according to the fourth embodiment. FIG. 13 is a diagram illustrating an example of the video displayed in the rearview monitor of the vehicular display system according to the fourth embodiment. In the vehicular display system 1 according to the fourth embodiment, the information processing performed in the controller 30 is different from the information processing performed in the vehicular display system 1 according to the third embodiment.

When the distance between another vehicle coming close from behind and the vehicle 100 detected by the approaching vehicle detecting unit 60 is shorter than a predetermined distance, the video synthesizing unit 52 displays, in an enlarged manner, at least either the rear right-side video data 120B or the rear left-side video data 130B that corresponds to the detected direction of another vehicle. More specifically, when the approaching vehicle detecting unit 60 detects, on the left-side of the rear video data 110B, another vehicle that is coming close from behind and that has a shorter distance to the vehicle 100 than the predetermined distance, the rear left-side video data 130B is enlarged in a synthesizing range thereof in the synthesized rear video data 110C. Similarly, when the approaching vehicle detecting unit 60 detects, on the right-side of the rear right-side video data 110B, another vehicle that is coming close from behind and that has a shorter distance to the vehicle 100 than the predetermined distance, the rear right-side video data 120B is enlarged in a synthesizing range thereof in the synthesized rear video data 110C. In the fourth embodiment, the rear right-side video data 120B or the rear left-side video data 130B corresponding to the direction in which another vehicle coming close from behind and having a shorter distance to the vehicle 100 than the predetermined distance is detected is enlarged with reference to the lower portion of the vehicle 100. Then, the video synthesizing unit 52 outputs, to the display controller 70, synthesized rear video data 110C2 in which the video data of the detected direction of another vehicle with a shorter distance to the vehicle 100 than the predetermined distance is enlarged.

When detecting another vehicle that is coming close from behind the vehicle 100 in the rear video data 110B, the approaching vehicle detecting unit 60 acquires a position of detection of another vehicle in the rear video data 110B. More specifically, the approaching vehicle detecting unit 60 detects, in the rear video data 110B, another vehicle coming close from behind the vehicle 100 and obtains whether the position of the detection of another vehicle is on the left-side or the right-side of the rear video data 110B.

The following explanation is given about the information processing performed in the controller 30. With reference to the flowchart illustrated in FIG. 12, the processes performed at Steps S41, S42, S43, S44, and S45 are identical to the processes performed at Steps S31, S34, S35, S32, and S33, respectively, illustrated in the flowchart in FIG. 11.

The controller 30 determines the presence or absence of another vehicle coming close (Step S41). If it is determined that another vehicle has come close (Yes at Step S41), then the controller 30 generates the synthesized rear video data 110C (Step S42) and displays the synthesized rear video data 110C (Step S43).

Then, the controller 30 determines whether or not the distance between another vehicle, which is detected at Step S41 to be coming close from behind, and the vehicle 100 is shorter than a predetermined distance (Step S45). If it is determined that the distance between another vehicle coming close from behind and the vehicle 100 is equal to or longer than the predetermined distance (No at Step S45), then the controller 30 again performs the process at Step S41. When it is determined that the distance between another vehicle coming close from behind and the vehicle 100 is shorter than the predetermined distance (Yes at Step S45), the system control proceeds to Step S46.

Subsequently, the controller 30 enlarges the displayed video data in the synthesizing range of at least either the rear right-side video data 120B or the rear left-side video data 130B that corresponds to the detected direction (Step S46). More specifically, in the synthesizing range of either the rear right-side video data 120B or the rear left-side video data 130B that corresponds to the detected direction in the synthesized rear video data 110C generated at Step S42, the controller 30 enlarges the displayed video of the rear right-side video data 120B or the rear left-side video data 130B and generates the synthesized rear video data 110C2. In the fourth embodiment, the controller 30 enlarges the video displayed in the synthesizing range of the rear left-side video data 130B that corresponds to the detected direction in the synthesized rear video data 110C, and generates the rear video data 110C2 as illustrated in FIG. 13, for example. In the process of enlarging the displayed video, the clipped range by the clipping unit 51 is narrowed, and the narrowly-clipped rear right-side video data 120B or the narrowly-clipped rear left-side video data 130B is displayed in an enlarged manner.

In this way, in the vehicular display system 1, when the distance between another vehicle coming close from behind and the vehicle 100 detected by the approaching vehicle detecting unit 60 is shorter than the predetermined distance, the synthesized rear video data 110C2, in which the rear right-side video data 120B or the rear left-side video data 130B corresponding to the detected direction is enlarged, is displayed in the display screen of the rearview monitor 140.

As described above, in the fourth embodiment, when the distance between another vehicle coming close from behind and the vehicle 100 detected by the approaching vehicle detecting unit 60 is shorter than the predetermined distance, the synthesized rear video data 110C2, in which the rear right-side video data 120B or the rear left-side video data 130B corresponding to the detected direction is enlarged, is displayed in the display screen of the rearview monitor 140. Thus, according to the fourth embodiment, another vehicle coming close from behind can be easily checked in the display screen of the rearview monitor 140. In this way, according to the fourth embodiment, it becomes possible to appropriately check the surroundings of the vehicle 100.

Fifth Embodiment

Figure 14:
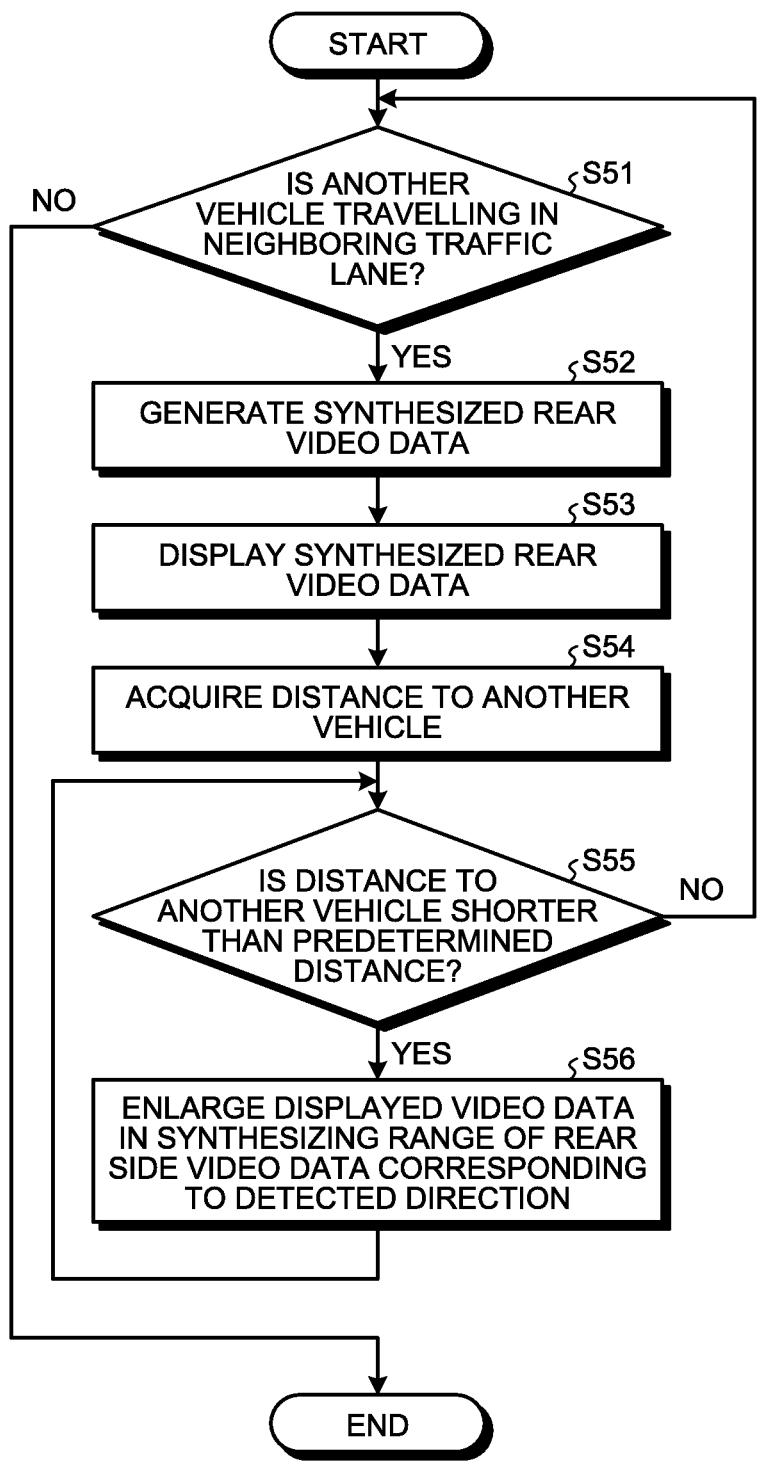
FIG. 14 is the flowchart for explaining the flow of processes performed in the controller of the vehicular display control device in the vehicular display system according to a fifth embodiment.

Explained below with reference to FIG. 14 is the vehicular display system 1 according to a fifth embodiment. FIG. 14 is a flowchart for explaining a flow of processes performed in the controller of the vehicular display control device in the vehicular display system according to the fifth embodiment. In the vehicular display system 1 according to the fifth embodiment, the information processing performed in the controller 30 is different from the information processing performed in the vehicular display system 1 according to the fourth embodiment.

The approaching vehicle detecting unit 60 detects a traffic lane in which the vehicle 100 is travelling and a traffic lane in which another vehicle is travelling. More specifically, the approaching vehicle detecting unit 60 performs a traffic lane recognition process with respect to the first-type video data 110A, and detects traffic lanes. Alternatively, the approaching vehicle detecting unit 60 can detect the traffic lanes based on navigation information or information acquired from an external server. The approaching vehicle detecting unit 60 detects, from the rear video data 110B, the traffic lane in which the vehicle 100 is travelling and another vehicle travelling in the neighboring traffic lane. Alternatively, the approaching vehicle detecting unit 60 can detect the traffic lane in which the vehicle 100 is travelling and also the neighboring traffic lanes excluding the opposite traffic lanes.

When the distance between another vehicle, which is detected by the approaching vehicle detecting unit 60 and travelling in the neighboring traffic lane to the traffic lane in which the vehicle 100 is travelling, and the vehicle 100 becomes shorter than a predetermined distance, the video synthesizing unit 52 synthesizes, on the upper portion on either the right-side or the left-side of the rear video data 110B, either the rear right-side video data 120B or the rear left-side video data 130B corresponding to the direction of the traffic lane of another vehicle.

The following explanation is given about the information processing performed in the controller 30. With reference to the flowchart illustrated in FIG. 14, the processes performed at Steps S52, S53, S54, and S56 are identical to the processes performed at Steps S42, S43, S44, and S46, respectively, illustrated in the flowchart in FIG. 12.

The premise for the processes illustrated in FIG. 14 is that, while the vehicle 100 is in operation, the rear video data 110B is displayed in the rearview monitor 140, the rear right-side video data 120B is displayed in the right sideview monitor 150, and the rear left-side video data 130B is displayed in the left-sideview monitor 160. Moreover, in such a state, the controller 30 continues detecting another vehicle travelling in the neighboring traffic lane. More specifically, based on the detection result obtained by the approaching vehicle detecting unit 60, the controller 30 detects another vehicle travelling in the neighboring traffic lane to the traffic lane in which the vehicle 100 is travelling.

The controller 30 determines the presence or absence of another vehicle travelling in the neighboring traffic lane (Step S51). If it is determined that no other vehicle is travelling in the neighboring traffic lane (No at Step S51), then the controller 30 ends the processes. When it is determined that there is another vehicle travelling in the neighboring traffic lane (Yes at Step S51), then the system control proceeds to Step S52.

Subsequently, the controller 30 determines whether or not the distance between another vehicle, which is travelling in the neighboring traffic lane to the traffic lane in which the vehicle 100 is travelling, and the vehicle 100 is shorter than a predetermined distance (Step S55). If it is determined that the distance between another vehicle, which is travelling in the neighboring traffic lane to the traffic lane in which the vehicle 100 is travelling, and the vehicle 100 is equal to or longer than the predetermined distance (No at Step S55), then the controller 30 again performs the process at Step S51. When it is determined that the distance between another vehicle, which is travelling in the neighboring traffic lane to the traffic lane in which the vehicle 100 is travelling, and the vehicle 100 is shorter than the predetermined distance (Yes at Step S55), the system control proceeds to Step S56.

The controller 30 enlarges the displayed video data in the synthesizing range of at least either the rear right-side video data 120B or the rear left-side video data 130B corresponding to the detected direction (Step S56).

In this way, in the vehicular display system 1, when the distance between another vehicle, which is travelling in the neighboring traffic lane to the traffic lane in which the vehicle 100 is travelling, and the vehicle 100 is shorter than the predetermined distance, either the rear right-side video data 120B or the rear left-side video data 130B that corresponds to the detected direction is enlarged and synthesized in the upper portion on the right-side or the left-side of the rear video data 110B.

As described above, in the fifth embodiment, when the distance between another vehicle, which is travelling in the neighboring traffic lane to the traffic lane in which the vehicle 100 is travelling, and the vehicle 100 is shorter than the predetermined distance, the rear video data 110C, in which either the rear right-side video data 120B or the rear left-side video data 130B that corresponds to the detected direction is enlarged and synthesized in the upper portion on the right-side or the left-side of the rear video data 110B, is displayed in the display screen of the rearview monitor 140. As a result, according to the fifth embodiment, when the distance between another vehicle, which is travelling in the neighboring traffic lane to the traffic lane in which the vehicle 100 is travelling, and the vehicle 100 is shorter than the predetermined distance, the rear side view corresponding to the detected direction can be confirmed in the display screen of the rearview monitor 140. Thus, according to the fifth embodiment, it becomes possible to suppress the movement of the line of sight of the driver. Thus, according to the fifth embodiment, it becomes possible to shorten the time required by the driver to check the rear view, the rear right-side view and the rear left-side view of the vehicle 100. In this way, the vehicular display system 1 enables appropriate checking of the surroundings of the vehicle 100.

Sixth Embodiment

Figure 15:
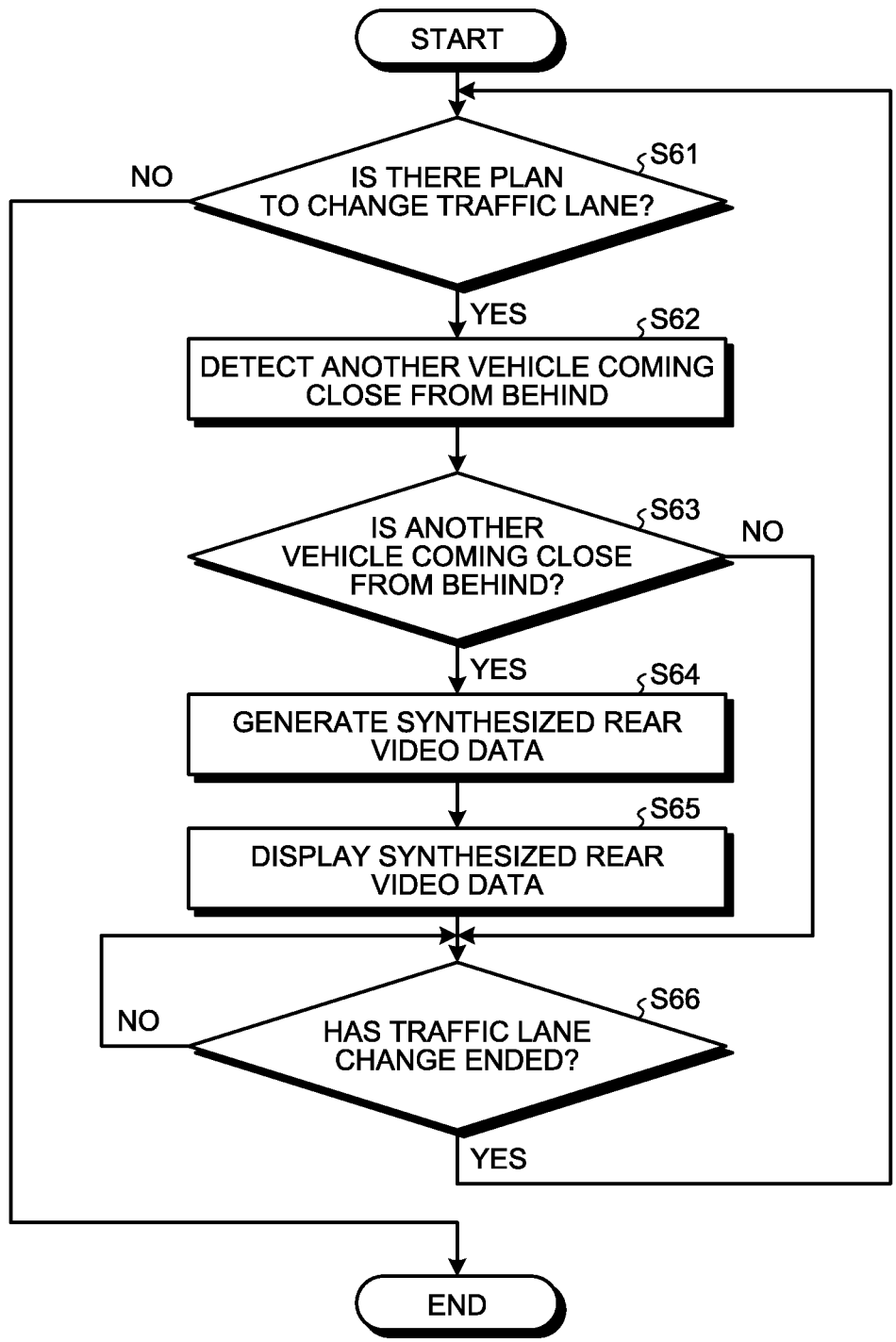
FIG. 15 is the flowchart for explaining the flow of processes performed in the controller of the vehicular display control device in the vehicular display system according to a sixth embodiment.

Explained below with reference to FIG. 15 is the vehicular display system 1 according to a sixth embodiment. FIG. 15 is a flowchart for explaining a flow of processes performed in the controller of the vehicular display control device in the vehicular display system according to the sixth embodiment. The vehicular display system 1 according to the sixth embodiment differs from the vehicular display system 1 according to the first embodiment in that the vehicular display system 1 according to the sixth embodiment includes a travelling state information acquiring unit (not illustrated).

The travelling state information acquiring unit works as a state detecting unit. The travelling state information acquiring unit is connected to a CAN (Controller Area Network) provided in the vehicle 100 and acquires OBD (On Board Diagnosis) II data, so as to acquire a variety of travelling state information in the vehicle 100. In the sixth embodiment, the travelling state information acquiring unit acquires, as the travelling state information of the vehicle 100, planned traffic-lane change information of the vehicle 100. More specifically, for example, the travelling state information acquiring unit acquires operation information for blinkers or acquires planned traffic-lane change information of the car navigation. Then, the travelling state information acquiring unit outputs the acquired travelling state to the video synthesizing unit 52.

The following explanation is given about the information processing performed in the controller 30. With reference to the flowchart illustrated in FIG. 15, the processes performed at Steps S63 to S65 are identical to the processes performed at Steps S11 to S13, respectively, illustrated in the flowchart in FIG. 9.

The premise for the processes illustrated in FIG. 15 is that, while the vehicle 100 is in operation, the rear video data 110B is displayed in the rearview monitor 140, the rear right-side video data 120B is displayed in the right sideview monitor 150, and the rear left-side video data 130B is displayed in the left-sideview monitor 160. Moreover, in such a state, the controller 30 continues detecting whether or not there is a plan to change the traffic lane. More specifically, based on the travelling state information acquired by the travelling state information acquiring unit, the controller 30 detects whether or not there is a plan to change the traffic lane.

The controller 30 determines the presence or absence of a plan to change the traffic lane (Step S61). If it is determined that there is no plan to change the traffic lane (No at Step S61), then the controller 30 ends the processes. When it is determined that there is a plan to change the traffic lane (Yes at Step S61), the system control proceeds to Step S62.

At Step S61, if it is determined that there is a plan to change the traffic lane (Yes at Step S61), then the controller 30 detects another vehicle coming close from behind (Step S62). The process at Step S62 either can be started in response to the determination at Step S61 that there is a plan to change the traffic lane, or can be performed on a constant basis.

Moreover, at Step S61, if it is determined that there is a plan to change the traffic lane (Yes at Step S61), then the travelling state information acquiring unit starts detecting end of traffic lane change against the planned change in the traffic lane. Concerning the detection of the end of traffic lane change, a traffic lane recognition process is performed by referring to the first-type video data 110A acquired from the rear camera 110, and the determination is performed based on the positional relationship with the recognized white lines. More specifically, when it is determined that there is a plan to change the traffic lane, it is determined that the change in the traffic lane has ended when the traffic lane in the traffic lane change direction is determined to move in the vehicle width direction of the vehicle 100 based on the operation information for the blinkers or the planned traffic-lane change information of the car navigation which contain the traffic lane change direction.

The controller 30 determines whether or not the traffic lane change has ended (Step S66). If it is determined that the traffic lane change has not ended (No at Step S66), then the controller 30 again performs the process at Step S66. When it is determined that the traffic lane change has ended (Yes at Step S66), the controller 30 again performs the process at Step S61.

In this way, in the vehicular display system 1, when there is a plan to change the traffic lane, the processes from Step S11 to Step S13 in the flowchart illustrated in FIG. 9 are performed. Until the change in the traffic lane is ended, the processes from Step S11 to Step S13 in the flowchart illustrated in FIG. 9 are performed on a continuing basis.

As described above, in the sixth embodiment, when there is a change in the traffic lane, the processes from Step S11 to Step S13 in the flowchart illustrated in FIG. 9 are performed. As a result, according to the sixth embodiment, when there is a plan to change the traffic lane, videos with an appropriate volume of information can be displayed at a timing at which the driver needs information.

Seventh Embodiment

Figure 16:
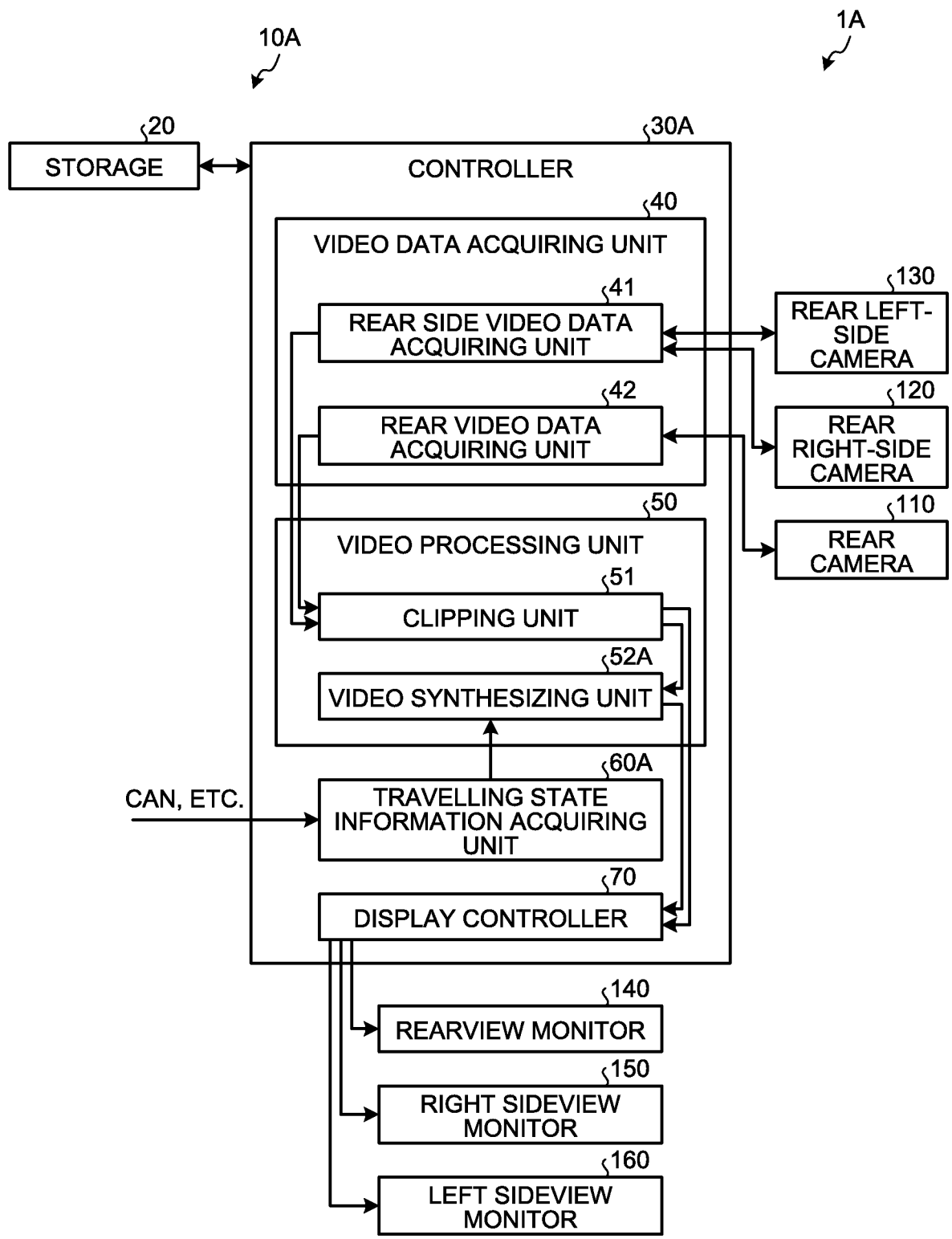
FIG. 16 is a block diagram illustrating an exemplary configuration of the vehicular display system according to a seventh embodiment.

Explained below with reference to FIGS. 16 to 22 is a vehicular display system 1A according to a seventh embodiment. FIG. 16 is a block diagram illustrating an exemplary configuration of the vehicular display system according to the seventh embodiment.

A vehicular display control device 10A includes the storage 20 and a controller 30A.

The controller 30A includes the video data acquiring unit 40, the video processing unit 50, a travelling state information acquiring unit 60A, and the display controller 70.

According to the travelling state acquired by the travelling state information acquiring unit 60A, a video synthesizing unit 52A synthesizes the rear right-side video data 120B and the rear left-side video data 130B in the upper portion on the right-side and the left-side of the rear video data 110B respectively to generate the rear video data 110C. In the seventh embodiment, when the travelling state information acquiring unit 60A acquires information indicating that the vehicle 100 is going in reverse, the video synthesizing unit 52A synthesizes the rear right-side video data 120B and the rear left-side video data 130B in the upper portion on the right-side and the left-side of the rear video data 110B respectively to generate the rear video data 110C. For example, the video synthesizing unit 52A generates the synthesized rear video data 110C as illustrated in FIG. 8.

The travelling state information acquiring unit 60A works as a state detecting unit. The travelling state information acquiring unit is connected to a CAN provided in the vehicle 100 and acquires OBD II data, so as to acquire a variety of travelling state information in the vehicle 100. The travelling state information acquiring unit 60A acquires, as the travelling state information of the vehicle 100, information indicating that the vehicle 100 is going in reverse. More specifically, for example, the travelling state information acquiring unit 60A acquires gearshift position information or travelling direction information. Then, the travelling state information acquiring unit 60A outputs the acquired travelling state to the video synthesizing unit 52A.

Figure 17:
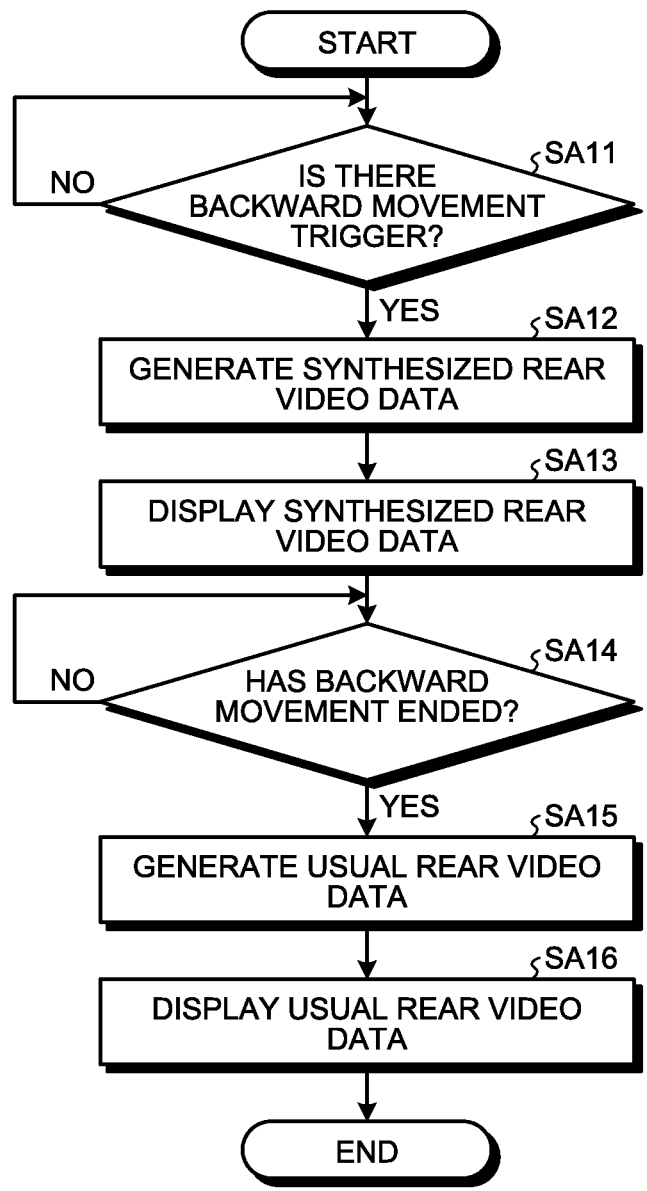
FIG. 17 is the flowchart illustrating the flow of processes performed in the controller of the vehicular display control device in the vehicular display system according to the seventh embodiment.

Explained below with reference to FIG. 17 is the information processing performed in the controller 30A. FIG. 17 is a flowchart illustrating a flow of processes performed in the controller of the vehicular display control device in the vehicular display system according to the seventh embodiment.

The premise for the processes illustrated in FIG. 17 is that, while the vehicle 100 is in operation, the rear video data 110B is displayed in the rearview monitor 140, the rear right-side video data 120B is displayed in the right sideview monitor 150, and the rear left-side video data 130B is displayed in the left-sideview monitor 160. Moreover, in such a state, the controller 30A continues acquiring the travelling state using the travelling state information acquiring unit 60A. More specifically, for example, using the travelling state information acquiring unit 60A, the controller 30A constantly monitors whether the travelling state information containing the gearshift position information or the travelling direction information is generated.

The controller 30A determines the presence or absence of a backward movement trigger (Step SA11). Herein, the backward movement trigger implies, for example, a case in which the gearshift position is set to "reverse". Alternatively, the backward movement trigger implies a case in which the travelling direction of the vehicle 100 changes toward the rear side of the direction of the vehicle 100. The controller 30A determines the presence or absence of the backward movement trigger based on the travelling state information acquired by the travelling state information acquiring unit 60A. If it is determined there is no backward movement trigger (No at Step SA11), then the controller 30A again performs the process at Step SA11. When it is determined that there is a backward movement trigger (Yes at Step SA11), the system control proceeds to Step SA12.

At Step SA11, when it is determined that there is a backward movement trigger, the controller 30A generates the synthesized rear video data 110C (Step SA12). More specifically, the controller 30A makes the clipping unit 51 clip the rear video data 110B from the first-type video data 110A. Then, the controller 30A makes the video synthesizing unit 52A generate the rear video data 110C by synthesizing the rear right-side video data 120B and the rear left-side video data 130B in the upper portion on the right-side and the left-side of the rear video data 110B respectively.

The controller 30A displays the synthesized rear video data 110C generated at Step SA12 (Step SA13). More specifically, the controller 30A makes the display controller 70 display either the usual rear video data 110B or the synthesized rear video data 110C in the rearview monitor 140.

The travelling state information acquiring unit 60A continues acquiring the travelling state even after it is determined at Step SA11 that there is a backward movement trigger. More specifically, the controller 30A continues acquiring the travelling state using the travelling state information acquiring unit 60A.

At Step SA13, during a period of time in which the synthesized rear video data 110C is displayed, the controller 30A determines the end of the backward movement based on the travelling state information acquired by the travelling state information acquiring unit 60A (Step SA14). More specifically, based on the travelling state information acquired by the travelling state information acquiring unit 60A, the controller 30A determines about releasing the backward movement trigger. If it is determined not to release the backward movement trigger (No at Step SA14), then the controller 30A continues displaying the synthesized rear video data 110C. When it is determined to release the backward movement trigger (Yes at Step SA14), the controller 30A generates the rear video data 110B (Step SA15) and displays the rear video data 110B (Step SA16). That is, at Steps SA15 and SA16, in an identical manner to the condition before the detection of the backward movement trigger at Step SA11, the display of the usual rear video data 110B is started and continued.

The controller 30A repeatedly performs the processes described above for each detection of the backward movement trigger.

Figure 18:
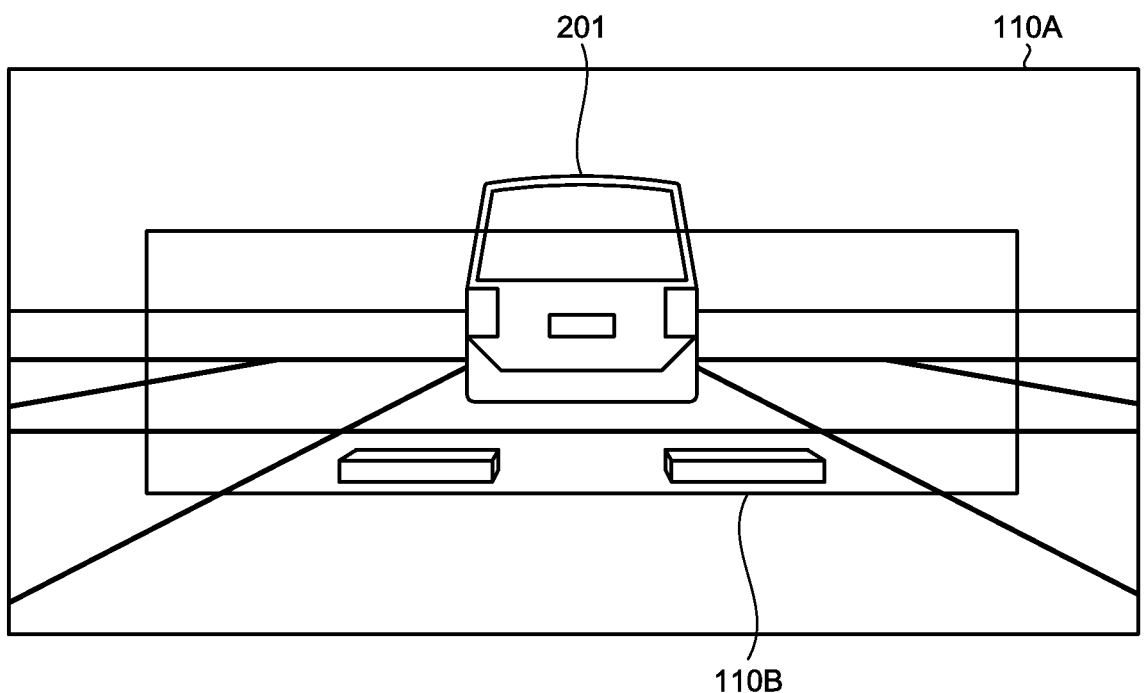
FIG. 18 is a diagram illustrating other example of the video data captured by the rear camera in the vehicular display system according to the seventh embodiment.
Figure 19:
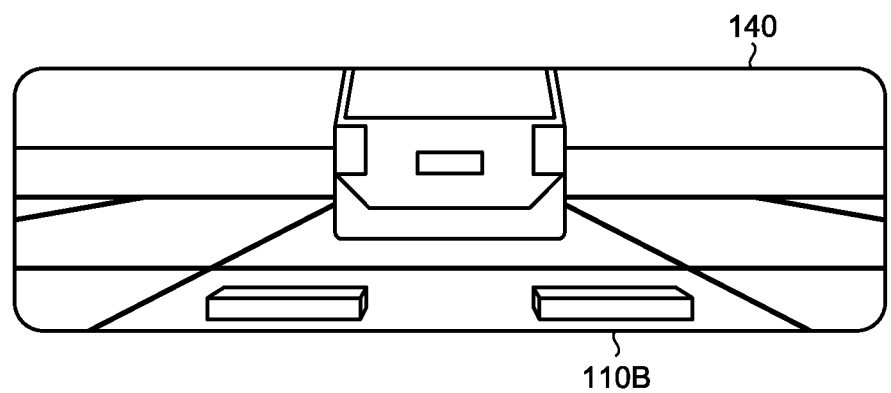
FIG. 19 is a diagram illustrating other example of the video displayed in the rearview monitor of the vehicular display system according to the seventh embodiment.
Figure 20:
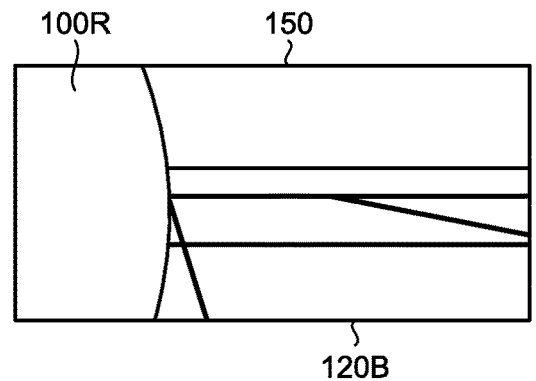
FIG. 20 is a diagram illustrating another example of the video displayed in the right sideview monitor of the vehicular display system according to the seventh embodiment.
Figure 21:
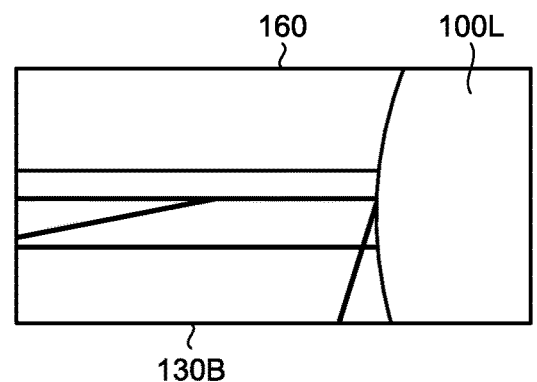
FIG. 21 is a diagram illustrating another example of the video displayed in the left sideview monitor of the vehicular display system according to the seventh embodiment.
Figure 22:
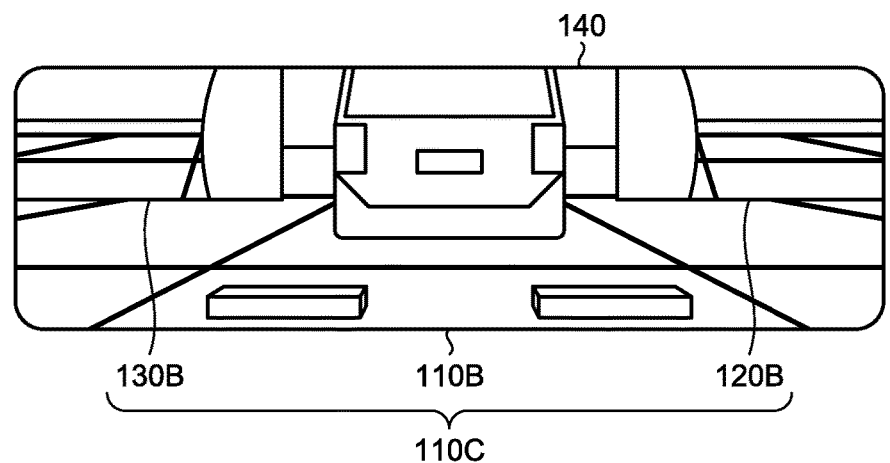
FIG. 22 is a diagram illustrating other example of the video displayed in the rearview monitor of the vehicular display system according to the seventh embodiment.

Explained below with reference to FIGS. 18 to 22 is a specific example of the information processing performed in the controller 30A. FIG. 18 is a diagram illustrating another example of the video data captured by the rear camera in the vehicular display system according to the seventh embodiment. FIG. 19 is a diagram illustrating another example of the video displayed in the rearview monitor of the vehicular display system according to the seventh embodiment. FIG. 20 is a diagram illustrating another example of the video displayed in the right sideview monitor of the vehicular display system according to the seventh embodiment. FIG. 21 is a diagram illustrating another example of the video displayed in the left sideview monitor of the vehicular display system according to the seventh embodiment. FIG. 22 is a diagram illustrating another example of the video displayed in the rearview monitor of the vehicular display system according to the seventh embodiment. In the vehicle 100, the gearshift position "reverse" is selected. In the first-type video data 110A illustrated in FIG. 18, another vehicle 201 that is parked in the rear portion of the vehicle 100 is captured. At Step SA11, the controller 30A determines that there is the backward movement trigger (Yes at Step SA11). Then, at Step SA12, the controller 30A makes the clipping unit 51 clip the rear video data 110B, which is illustrated in FIG. 19, from the first-type video data 110A illustrated in FIG. 18. Subsequently, the controller 30A makes the video synthesizing unit 52A synthesize the rear right-side video data 120B, which is illustrated in FIG. 20, in the upper portion on the right-side of the rear video data 110B, synthesize the rear left-side video data 130B, which is illustrated in FIG. 21, in the upper portion on the left-side of the rear video data 110B, and generate the synthesized rear video data 110C. Then, at Step SA13, the controller 30A makes the display controller 70 display the synthesized rear video data 110C, which is illustrated in FIG. 22, in the display screen of the rearview monitor 140.

In this way, in the vehicular display system 1A, according to the travelling state acquired by the travelling state information acquiring unit 60A, the synthesized rear video data 110C is displayed in the display screen of the rearview monitor 140.

As described above, in the seventh embodiment, according to the travelling state acquired by the travelling state information acquiring unit 60A, the synthesized rear video data 110C is displayed in the display screen of the rearview monitor 140. Moreover, in the seventh embodiment, at the time of the backward movement of the vehicle 100, the synthesized rear video data 110C, which is formed by synthesizing the rear right-side video data 120B and the rear left-side video data 130B in the upper portion on the right-side and the left-side of the rear video data 110B respectively, is displayed in the display screen of the rearview monitor 140. As a result, according to the seventh embodiment, at the time of the backward movement of the vehicle 100, the rear view of the vehicle 100 as well as the rear side views of the vehicle 100 can be checked in the display screen of the rearview monitor 140. Thus, according to the seventh embodiment, it becomes possible to suppress the movement of the line of sight of the driver. More specifically, according to the seventh embodiment, the rear side views in the roadside direction can be checked without moving the line of sight from the rearview monitor 140 for visually confirming the right sideview monitor 150 and the left sideview monitor 160. Thus, according to the seventh embodiment, it becomes possible to shorten the time required by the driver to check the rear view, the right-side view, and the left-side view of the vehicle 100. In this way, the vehicular display system 1A enables appropriate checking of the surroundings of the vehicle 100.

In the seventh embodiment, at the time of the backward movement of the vehicle 100, the synthesized rear video data 110C is displayed in the display screen of the rearview monitor 140. As a result, according to the seventh embodiment, the rear view of the vehicle 100 as well as the rear side views of the vehicle 100 can be automatically displayed in the display screen of the rearview monitor 140 regardless of any operation performed by the driver. In this way, the vehicular display system 1A enables appropriate checking of the surroundings of the vehicle 100.

According to the seventh embodiment, at the time of the backward movement of the vehicle 100, if a predetermined condition is satisfied, the synthesized rear video data 110C is displayed in the display screen of the rearview monitor 140. In other words, according to the seventh embodiment, if the predetermined condition is satisfied, the synthesized rear video data 110C is displayed. In other cases, the rear video data 110B is displayed. Hence, according to the seventh embodiment, at the time of the backward movement of the vehicle 100, videos with an appropriate volume of information can be displayed at the timing at which the driver needs information.

According to the seventh embodiment, the video synthesizing unit 52A synthesizes the rear right-side video data 120B and the rear left-side video data 130B in the upper portion on the right-side and the left-side of the rear video data 110B respectively. In other words, according to the seventh embodiment, the video synthesizing unit 52A reduces the overlapping range of the rear right-side video data 120B and the rear left-side video data 130B with respect to the range below the vanishing point of the rear video data 110B. In other words, the upper portion on the right-side and the left-side of the rear video data 110B has low priority for rear confirmation during the backward movement, and the confirmation according to the rear right-side video data 120B and the rear left-side video data 130B is more appropriate. Hence, in the seventh embodiment, regardless of the travelling state, the rear view can be checked just like a conventional optical rearview mirror in the range with a high degree of necessity for safety confirmation to be performed by the driver while driving.

Eighth Embodiment

Figure 23:
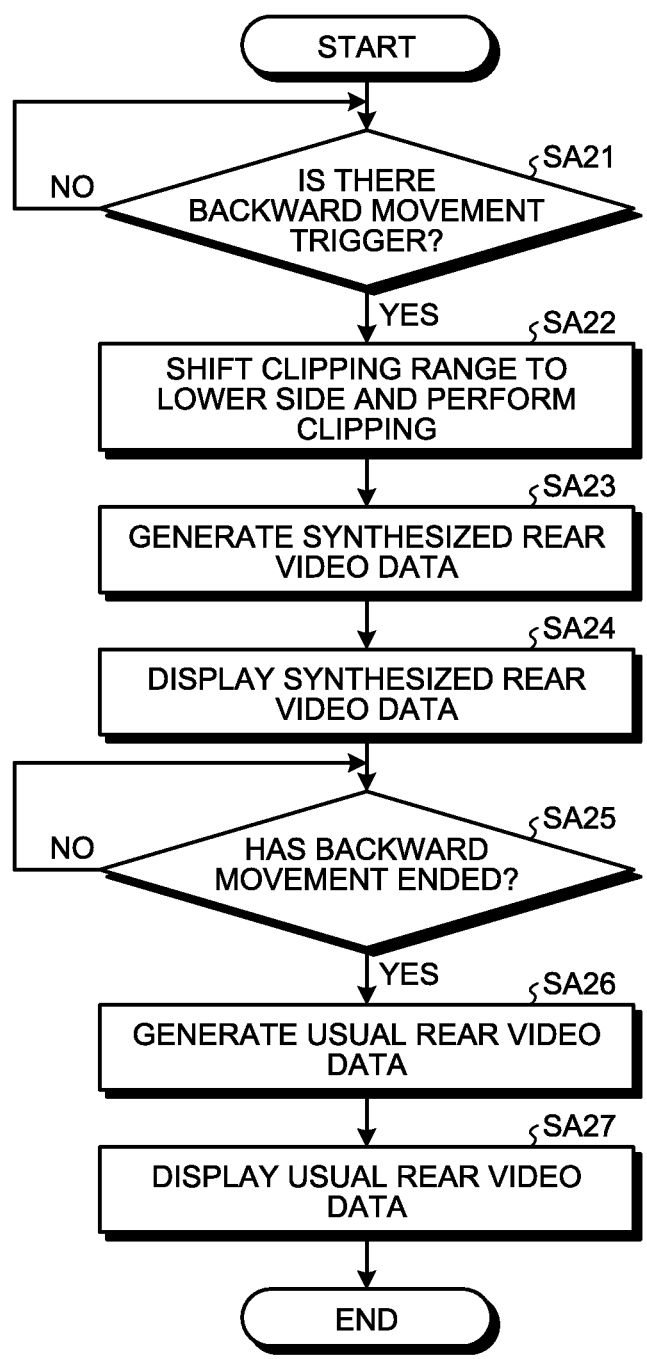
FIG. 23 is the flowchart for explaining the flow of processes performed in the controller of the vehicular display control device in the vehicular display system according to an eighth embodiment.
Figure 24:
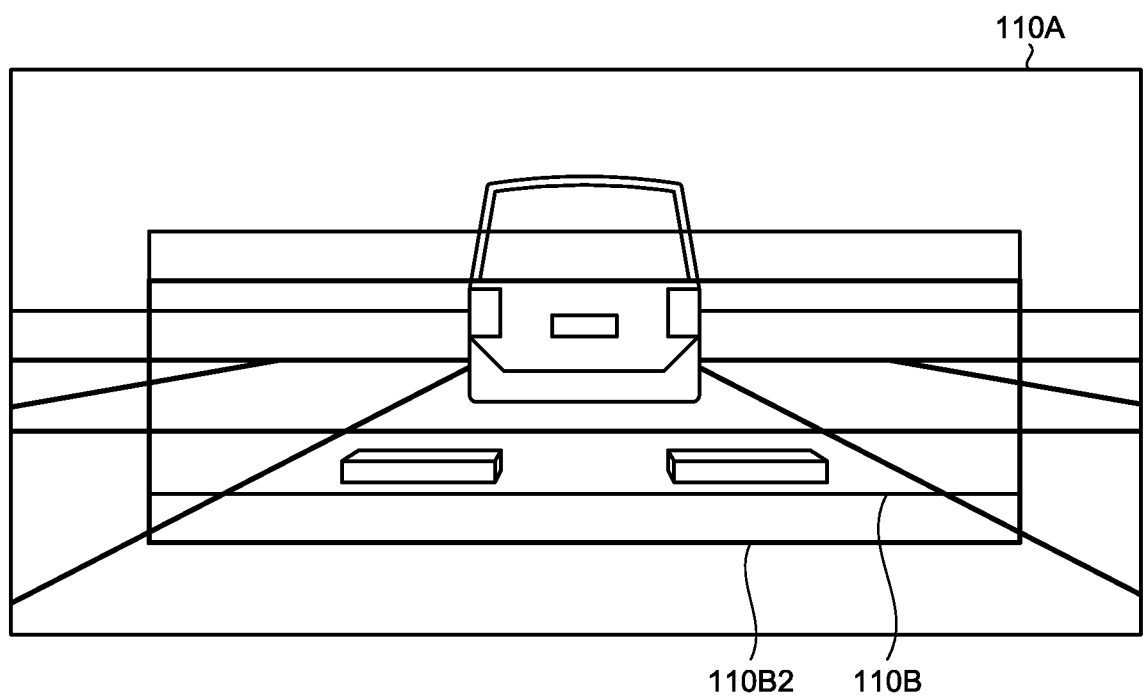
FIG. 24 is a diagram illustrating an example of the video data captured by the rear camera of the vehicular display system according to the eighth embodiment.
Figure 25:
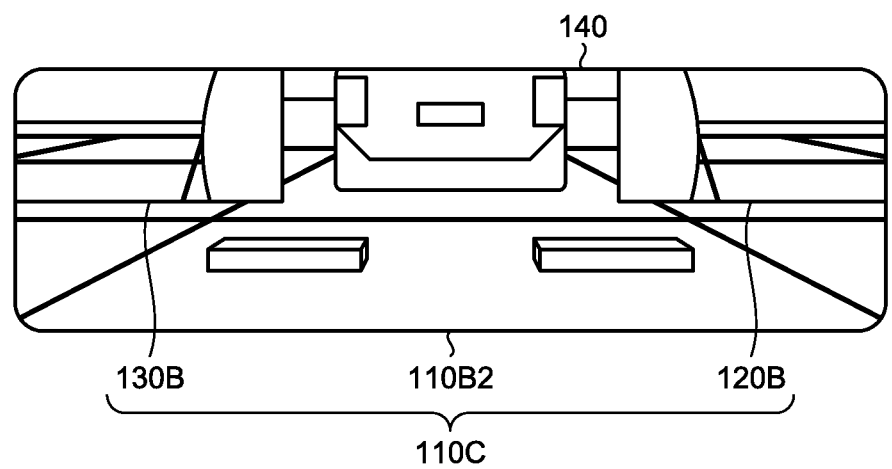
FIG. 25 is a diagram illustrating an example of the video displayed in the rearview monitor of the vehicular display system according to the eighth embodiment.

Explained below with reference to FIGS. 23 to 25 is the vehicular display system 1A according to an eighth embodiment. FIG. 23 is a flowchart for explaining a flow of processes performed in the controller of the vehicular display control device in the vehicular display system according to the eighth embodiment. FIG. 24 is a diagram illustrating an example of the video data captured by the rear camera of the vehicular display system according to the eighth embodiment. FIG. 25 is a diagram illustrating an example of the video displayed in the rearview monitor of the vehicular display system according to the eighth embodiment. The vehicular display system 1A according to the eighth embodiment has an identical fundamental configuration to the configuration of the vehicular display system 1A according to the seventh embodiment. In the following explanation, the identical constituent elements to those of the vehicular display system 1A according to the seventh embodiment are referred to by the same or equivalent reference numerals, and their detailed explanation is not given again. In the vehicular display system 1A according to the eighth embodiment, the information processing performed in the clipping unit 51 and the controller 30A is different from the information processing performed in the vehicular display system 1A according to the seventh embodiment.

According to the travelling state, the clipping unit 51 sets the clipping range in the first-type video data 110A to be lower than the clipping range for the usual rear video data 110B. More specifically, when the display controller 70 displays the synthesized rear video data 110C acquired by the video synthesizing unit 52A, the clipping unit 51 sets the clipping range in the first-type video data 110A in such a way that the lower portion thereof is clipped as compared to the case of displaying the non-synthesized usual rear video data 110B. For example, the clipping range is set to include a lower portion with a predetermined number of pixels than the clipping range for displaying the non-synthesized usual rear video data 110B. In other words, when the display controller 70 displays the synthesized rear video data 110C acquired by the video synthesizing unit 52A, the clipping unit 51 sets the clipping range to include the positions closer to the vehicle 100. Then, the clipping unit 51 outputs clipped rear video data 110B2 to the video synthesizing unit 52A and the display controller 70.

Explained below with reference to FIG. 23 is the information processing performed in the controller 30A. With reference to the flowchart illustrated in FIG. 23, the processes performed at Step SA21 and Steps SA24 to SA27 are identical to the processes performed at Step SA11 and Steps SA13 to SA16, respectively, illustrated in the flowchart in FIG. 17.

The controller 30A shifts the clipping range to the lower side and clips the rear video data 110B2 (Step SA22).

The controller 30A generates the synthesized rear video data 110C (Step SA23). More specifically, the controller 30A synthesizes the rear right-side video data 120B and the rear left-side video data 130B in the upper portion on the right-side and the left-side of the rear video data 110B2 clipped by the clipping unit 51 respectively to generate the rear video data 110C.

Explained below with reference to FIGS. 24 and 25 is a specific example of the information processing performed in the controller 30A. In the vehicle 100, the gearshift position "reverse" is selected. In the first-type video data 110A illustrated in FIG. 24, the other vehicle 201 that is parked in the rear portion of the vehicle 100 is captured. At Step SA21, the controller 30A determines that there is a backward movement trigger (Yes at Step SA21). Then, at Step SA22, the controller 30A makes the clipping unit 51 shift the clipping range for the rear video data 110B to the lower side and clip the rear video data 110B2 from the first-type video data 110A illustrated in FIG. 24. Subsequently, at Step SA23, the controller 30A makes the video synthesizing unit 52A synthesize the rear right-side video data 120B and the rear left-side video data 130B in the upper portion on the right-side and the left-side of the rear video data 110B2 respectively to generate the rear video data 110C. Then, at Step SA24, the controller 30A makes the display controller 70 display the synthesized rear video data 110C, which is illustrated in FIG. 25, in the display screen of the rearview monitor 140.

In this way, in the vehicular display system 1A, according to the travelling state acquired by the travelling state information acquiring unit 60A, the lower portion is clipped as compared to the non-synthesized usual rear video data 110B, and the synthesized rear video data 110C is displayed in the display screen of the rearview monitor 140.

As described above, in the eighth embodiment, at the time of the backward movement of the vehicle 100, the rear right-side video data 120B and the rear left-side video data 130B is synthesized in the upper portion on the right-side and the left-side of the rear video data 110B2 clipped by shifting the clipping range to the lower side respectively, and the synthesized rear video data 110C is displayed in the display screen of the rearview monitor 140. As a result, according to the eighth embodiment, the rear view of the vehicle 100 including the closer positions to the vehicle 100 can be confirmed in the display screen of the rearview monitor 140. In this way, the vehicular display system 1A enables appropriate checking of the surroundings of the vehicle 100.

Ninth Embodiment

Figure 26:
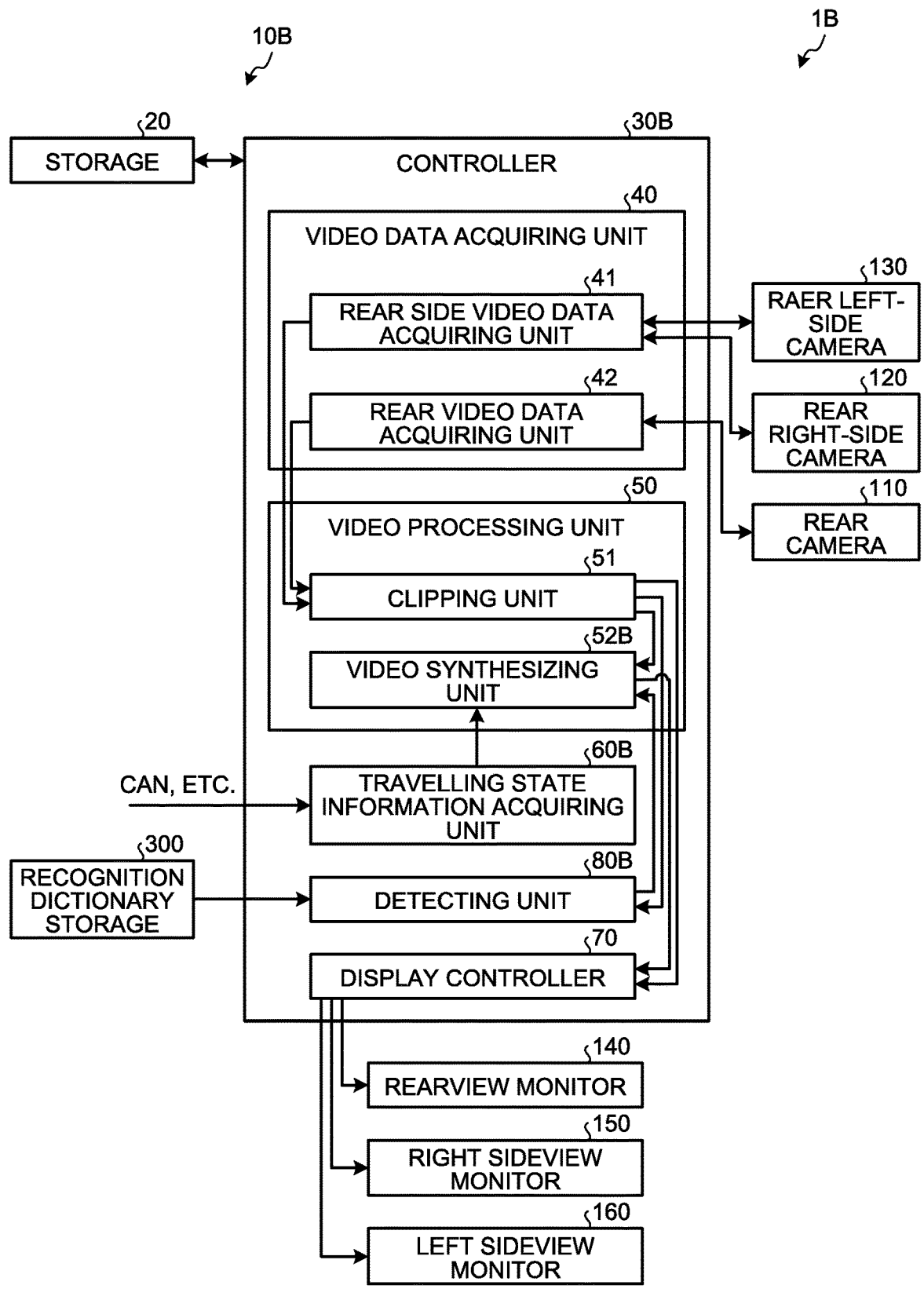
FIG. 26 is a block diagram illustrating an exemplary configuration of the vehicular display system according to a ninth embodiment.
Figure 27:
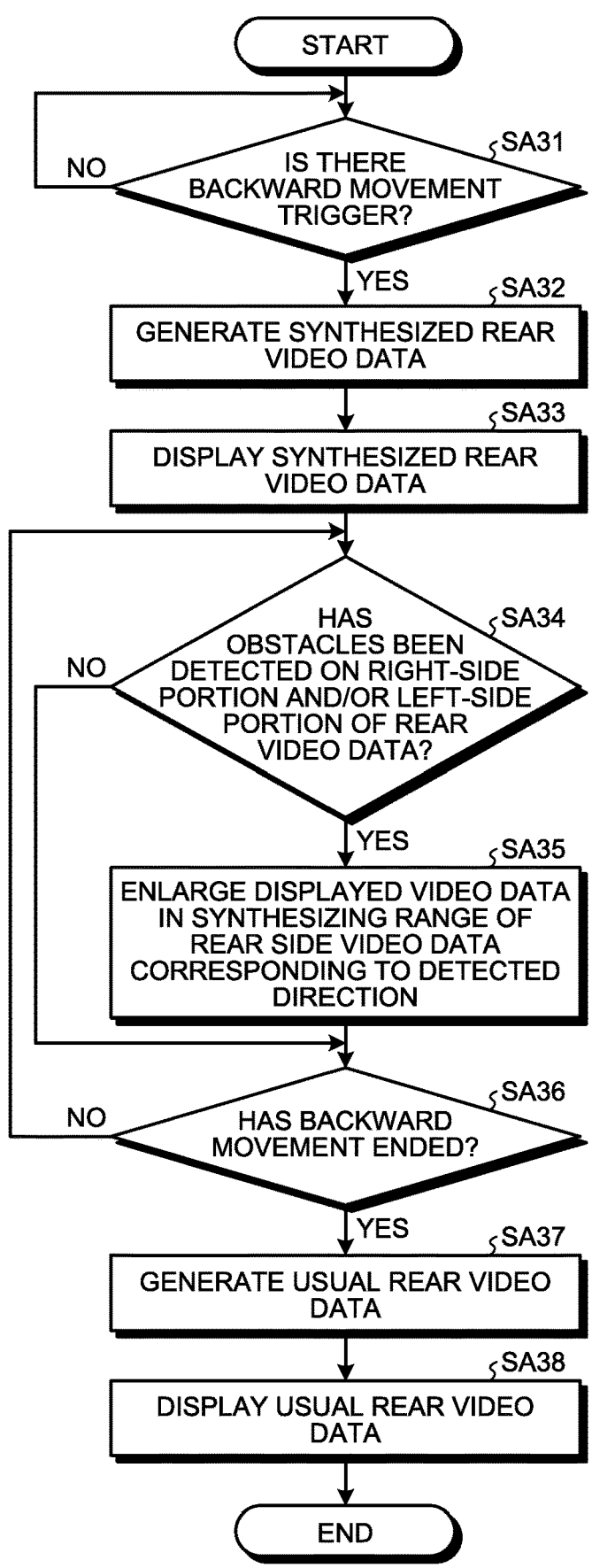
FIG. 27 is the flowchart for explaining the flow of processes performed in the controller of the vehicular display control device in the vehicular display system according to the ninth embodiment.
Figure 28:
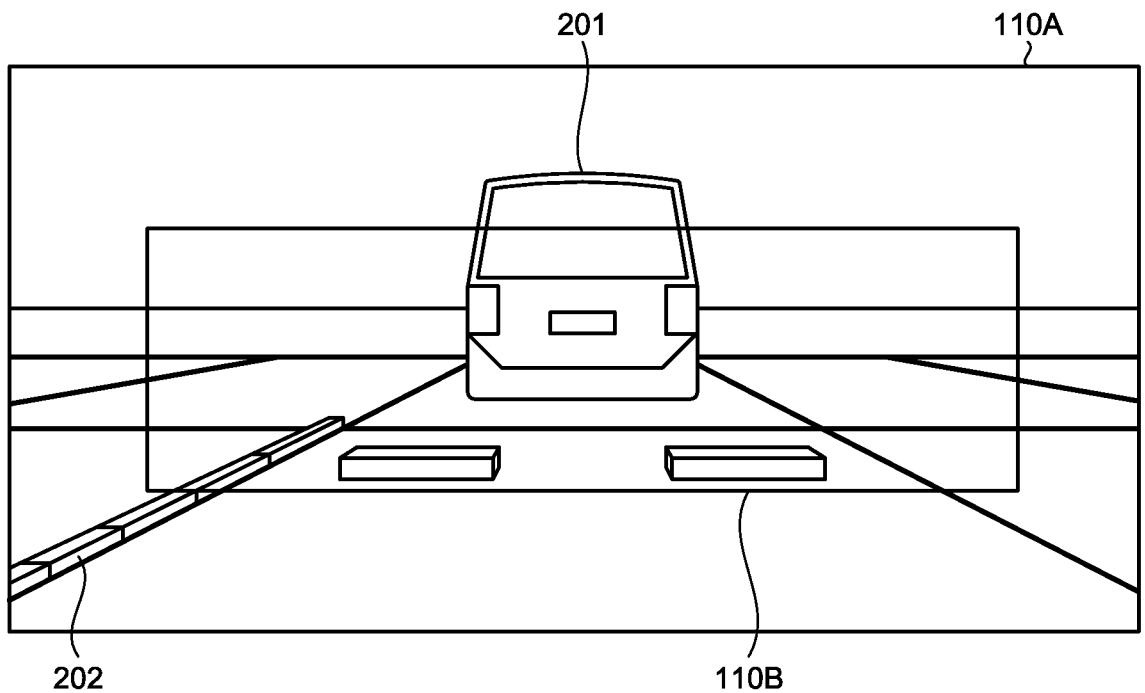
FIG. 28 is a diagram illustrating an example of the video data captured by the rear camera in the vehicular display system according to the ninth embodiment.
Figure 29:
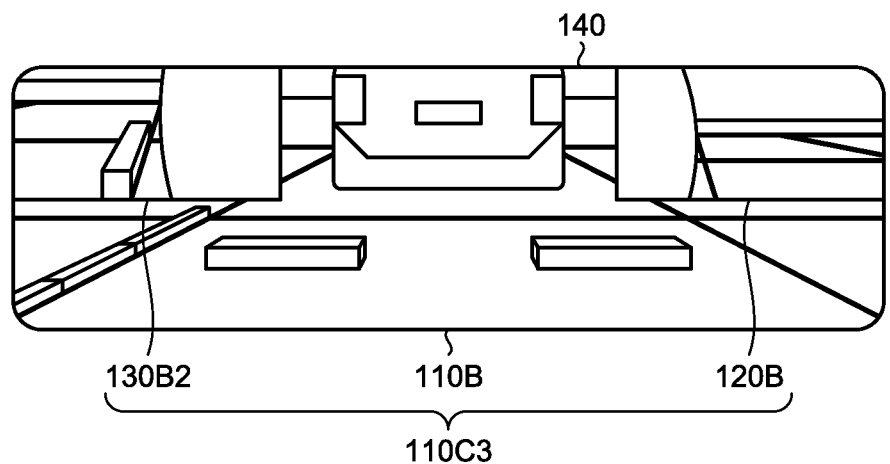
FIG. 29 is a diagram illustrating an example of the video displayed in the rearview monitor of the vehicular display system according to the ninth embodiment.

Explained below with reference to FIGS. 26 to 29 is a vehicular display system 1B according to a ninth embodiment. FIG. 26 is a block diagram illustrating an exemplary configuration of the vehicular display system according to the ninth embodiment. FIG. 27 is a flowchart for explaining a flow of processes performed in a controller of a vehicular display control device in the vehicular display system according to the ninth embodiment. FIG. 28 is a diagram illustrating an example of the video data captured by the rear camera in the vehicular display system according to the ninth embodiment. FIG. 29 is a diagram illustrating an example of the video displayed in the rearview monitor of the vehicular display system according to the ninth embodiment. The vehicular display system 1B according to the ninth embodiment differs from the vehicular display system 1A according to the seventh embodiment in that the vehicular display system 1B according to the ninth embodiment includes a detecting unit 80B and recognition dictionary storage 300, and also differs therefrom in information processing performed by the controller 30B.

The recognition dictionary storage 300 is used to store, for example, a recognition dictionary for enabling collation of patterns such as shapes, sizes, and colors in omnidirectional vision of obstacles such as vehicles, persons, walls, curbstones, and plants. Examples of the recognition dictionary storage 300 include a semiconductor flash memory such as a RAM, a ROM, or a flash memory; and a memory device such as a hard disc, an optical disc, or an external memory device connected via a network.

The detecting unit 80B detects the obstacles present in the right-side portion and the left-side portion of the rear video data 110B. The right-side portion of the rear video data 110B is an area overlapping with a confirmation range by the right sideview monitor 150 and the left-side portion of the rear video data 110B is an area overlapping with a confirmation range by the left sideview monitor 160. For example, the horizontal size of each of the right-side portion and the left-side portion of the rear video data 110B is about one third of the horizontal size of the rear video data 110B. The detecting unit 80B performs an obstacle recognition process for the right-side portion and the left-side portion of the rear video data 110B, and detects obstacles. More specifically, with respect to the right-side portion and the left-side portion of the rear video data 110B, the detecting unit 80B performs pattern matching using the recognition dictionary stored in the recognition dictionary storage 300, and detects the presence of the obstacles. Then, the detecting unit 80B performs image processing and tracks the detected obstacles. Moreover, the detecting unit 80B outputs the detection result to a video synthesizing unit 52B.

When the detecting unit 80B detects the obstacle, the video synthesizing unit 52B displays, in an enlarged manner, at least either the rear right-side video data 120B or the rear left-side video data 130B that corresponds to the direction of the detected obstacle in the synthesized rear video data 110C. More specifically, if the detecting unit 80B detects the obstacle in the left-side portion of the rear video data 110B, then the video synthesizing unit 52B enlarges the rear left-side video data 130B within the synthesizing range thereof in the synthesized rear video data 110C. If the detecting unit 80B detects the obstacle in the right-side portion of the rear video data 110B, then the video synthesizing unit 52B enlarges the rear right-side video data 120B within the synthesizing range thereof in the synthesized rear video data 110C. In the ninth embodiment, in the rear right-side video data 120B or the rear left-side video data 130B corresponding to the direction of the detected obstacle, the enlargement is performed with reference to the lower portion of the vehicle 100. Then, the video synthesizing unit 52B outputs synthesized rear video data 110C3 in which the video data of the direction of the detected obstacle is enlarged.

The following explanation is given about the information processing performed in the controller 30B. With reference to the flowchart illustrated in FIG. 27, the processes performed at Steps SA31 to SA33 and at Steps SA36 to SA38 are identical to the processes performed at Steps SA11 to SA13 and at Steps SA14 to SA16, respectively, illustrated in the flowchart in FIG. 17.

The controller 30B determines whether or not to detect obstacles on the right-side portion and/or the left-side portion of the rear video data 110B (Step SA34). More specifically, the controller 30B determines whether or not the detecting unit 80B has detected the obstacles on the right-side portion and/or the left-side portion of the rear video data 110B. If it is determined that the detecting unit 80B has not detected the obstacles on the right-side portion and the left-side portion of the rear video data 110B (No at SA34), then the system control proceeds to Step SA36. On the other hand, if it is determined that the detecting unit 80B has detected the obstacles on the right-side portion and/or the left-side portion of the rear video data 110B (Yes at Step SA34), then the system control proceeds to Step SA35.

The controller 30B enlarges the displayed video in the synthesizing range of at least either the rear right-side video data 120B or the rear left-side video data 130B corresponding to the direction of the detected obstacle (Step SA35). More specifically, in the synthesizing range of either the rear right-side video data 120B or the rear left-side video data 130B corresponding to the direction of the detected obstacle in the synthesized rear video data 110C generated at Step SA32, the controller 30B enlarges the video data of either the rear right-side video data 120B or the rear left-side video data 130B to generate the synthesized rear video data 110C3. In the process of enlarging the displayed video, the clipping range by the clipping unit 51 is narrowed, and the narrowly-clipped rear right-side video data 120B or the narrowly-clipped rear left-side video data 130B is displayed in an enlarged manner.

Explained with reference to FIGS. 28 and 29 is a specific example of the information processing performed in the controller 30B. In the vehicle 100, the gearshift position "reverse" is selected. In the first-type video data 110A illustrated in FIG. 28, a curbstone 202 is appearing in the left-side portion. At Step SA31, the controller 30B determines that there is a backward movement trigger (Yes at Step SA31). Then, at Step SA32, the controller 30B makes the clipping unit 51 clip the rear video data 110B from the first-type video data 110A illustrated in FIG. 28. Subsequently, the controller 30B makes the video synthesizing unit 52B generate the rear video data 110C by synthesizing the rear right-side video data 120B and the rear left-side video data 130B in the upper portion on the right-side and the left-side of the rear video data 110B respectively. Then, at Step SA34, the controller 30B determines that the detecting unit 80B has detected an obstacle on the right-side portion or the left-side portion of the rear video data 110B (Yes at Step SA34). Subsequently, at Step SA35, the controller 30B makes the video synthesizing unit 52B enlarge the rear left-side video data 130B corresponding to the direction of the detected obstacle within the synthesizing range thereof to generate the synthesized rear video data 110C3. Then, the controller 30B makes the display controller 70 display, in the display screen of the rearview monitor 140, the synthesized rear video data 110C3 in which rear left-side video data 130B2 that is enlarged as illustrated in FIG. 29 is synthesized.

In this way, in the vehicular display system 1B, when an obstacle is detected in the right-side portion or the left-side portion of the rear video data 110B, the synthesized rear video data 110C3, in which the rear right-side video data 120B or the rear left-side video data 130B corresponding to the direction of the detected obstacle is enlarged, is displayed in the display screen of the rearview monitor 140.

As described above, in the ninth embodiment, when an obstacle is detected in the right-side portion or the left-side portion of the rear video data 110B, the synthesized rear video data 110C3, in which the rear right-side video data 120B or the rear left-side video data 130B corresponding to the direction of the detected obstacle is enlarged, is displayed in the display screen of the rearview monitor 140. Hence, according to the ninth embodiment, in the display screen of the rearview monitor 140, the obstacles present on the right-side and/or the left-side of the vehicle 100 can be easily checked. In this way, according to the ninth embodiment, it becomes possible to appropriately check the surroundings of the vehicle 100.

10th Embodiment

Figure 30:
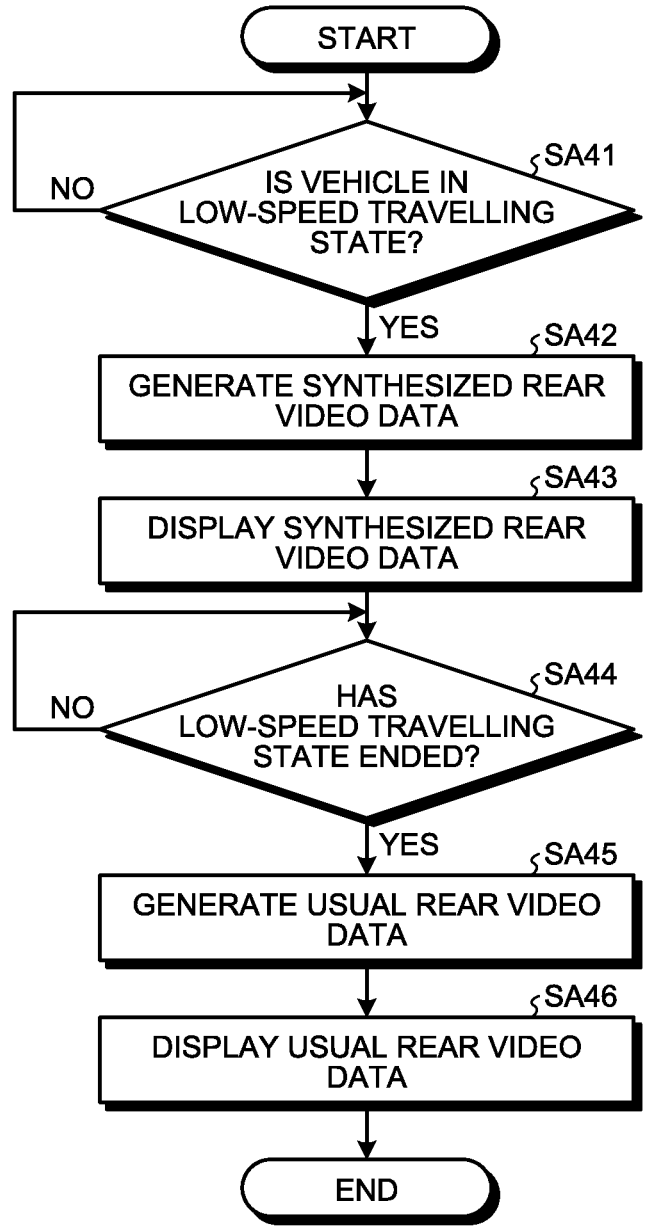
FIG. 30 is the flowchart for explaining the flow of processes performed in the controller of the vehicular display control device of the vehicular display system according to a 10th embodiment.

Explained below with reference to FIG. 30 is the vehicular display system 1A according to a 10th embodiment. FIG. 30 is a flowchart for explaining a flow of processes performed in the controller of the vehicular display control device of the vehicular display system according to the 10th embodiment. In the vehicular display system 1A according to the 10th embodiment, the information processing performed by the controller 30A is different from the information processing performed in the vehicular display system 1A according to the seventh embodiment.

The travelling state information acquiring unit 60A acquires information related to a travelling speed of the vehicle 100 as information indicating the travelling state of the vehicle 100.

When the travelling state information acquiring unit 60A acquires the information indicating that the vehicle 100 is in a low-speed travelling state, the video synthesizing unit 52A synthesizes the rear right-side video data 120B and the rear left-side video data 130B in the upper portion on the right-side and the left-side of the rear video data 110B respectively. Herein, the low-speed travelling state represents a state in which it is determined that, for example, the travelling state acquired by the travelling state information acquiring unit 60A indicates continuation of a condition in which the travelling speed of the vehicle 100 is slower than a predetermined speed. Alternatively, the low-speed travelling state can be a state in which, based on navigation information or information acquired from an external server, it is determined that the travelling path of the vehicle 100 goes through an urban area, a residential area, a shopping area, or a road with a number of pedestrians. Still alternatively, the low-speed travelling state can be a state in which, based on navigation information or information acquired from an external server, it is determined that the vehicle 100 is travelling on a road the width of which is smaller than a predetermined width. Still alternatively, the low-speed travelling state can be a state in which, based on navigation information or information acquired from an external server, it is determined that the vehicle 100 is travelling on a road of a single traffic lane.

The following explanation is given about the information processing performed in the controller 30A. With reference to the flowchart illustrated in FIG. 30, the processes performed at Steps SA42, SA43, SA45, and SA46 are identical to the processes performed at Steps SA12, SA13, SA15, and SA16, respectively, illustrated in the flowchart in FIG. 17.

The controller 30A determines whether or not the travelling state of the vehicle 100 is the low-speed travelling state (Step SA41). More specifically, the controller 30A determines whether or not the travelling state acquired by the travelling state information acquiring unit 60A indicates that the vehicle 100 is in the low-speed travelling state. If it is determined that the travelling state is not the low-speed travelling state (No at Step SA41), then the controller 30A again performs the process at Step SA41. When it is determined that the travelling state is the low-speed travelling state (Yes at Step SA41), the system control proceeds to Step SA42.

Even after it is determined at Step SA41 that the travelling state is the low-speed travelling state, the travelling state information acquiring unit 60A continues acquiring the travelling state. More specifically, the controller 30A continues acquiring the travelling state using the travelling state information acquiring unit 60A.

At Step SA43, during a period in which the synthesized rear video data 110C is displayed (Step SA 42 and SA43), the controller 30A determines the end of the low-speed travelling state based on the travelling state information acquired by the travelling state information acquiring unit 60A (Step SA44). If it is determined that the low-speed travelling state has not ended (No at Step SA44), then the controller 30A continues to display the synthesized rear video data 110C. On the other hand, if it is determined that the low-speed travelling state has ended (Yes at Step SA44), then the controller 30A generates the rear video data 110B (Step SA45) and displays the rear video data 110B (Step SA46). That is, at Steps SA45 and SA46, the display of the usual rear video data 110B is started and continued to be displayed like a state before the determination at Step SA41 that the travelling state is the low-speed travelling state.

In this way, in the vehicular display system, when the travelling state is the low-speed travelling state, the synthesized rear video data 110C is displayed in the display screen of the rearview monitor 140.

As described above, in the 10th embodiment, when the travelling state is the low-speed travelling state, the synthesized rear video data 110C is displayed in the display screen of the rearview monitor 140. As a result, according to the 10th embodiment, when the travelling state is the low-speed travelling state, the rear side portions of the vehicle 100 can be checked in the display screen of the rearview monitor 140. Hence, according to the 10th embodiment, it becomes possible to suppress the movement of the line of sight of the driver. Thus, according to the 10th embodiment, it becomes possible to shorten the time required by the driver to check the rear portion and the rear side portions. In this way, the vehicular display system 1A enables appropriate checking of the surroundings of the vehicle 100.

At the time of travelling with a low speed, it is known that a period for which the rearview monitor 140 is visually checked by the driver becomes longer. According to the 10th embodiment, in the low-speed travelling state, when the driver wishes to check the rear side portions of the vehicle 100, the rear portion of the vehicle 100 as well as the rear side portions of the vehicle 100 can be checked in the display screen of the rearview monitor 140. In this way, according to the 10th embodiment, appropriate information can be provided to the driver via the display screen of the rearview monitor 140 at the timing at which the driver needs information.

11th Embodiment

Figure 31:
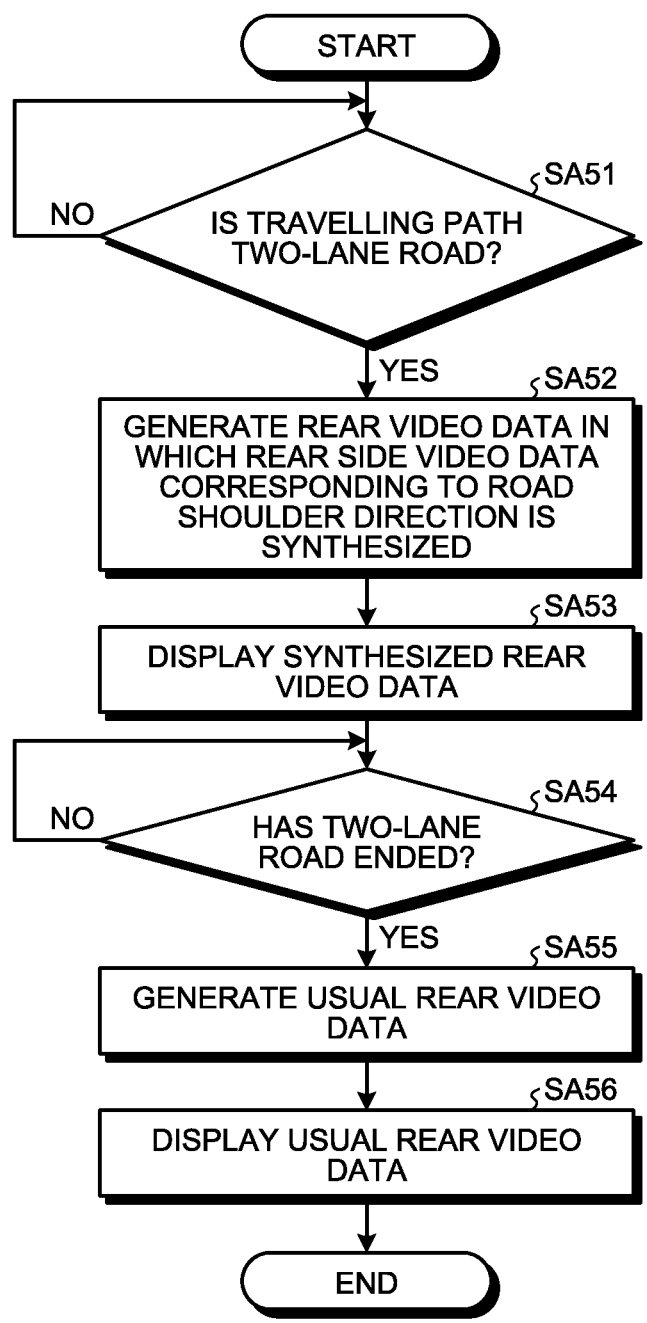
FIG. 31 is the flowchart for explaining the flow of processes performed in the controller of the vehicular display control device of the vehicular display system according to an 11th embodiment.
Figure 32:
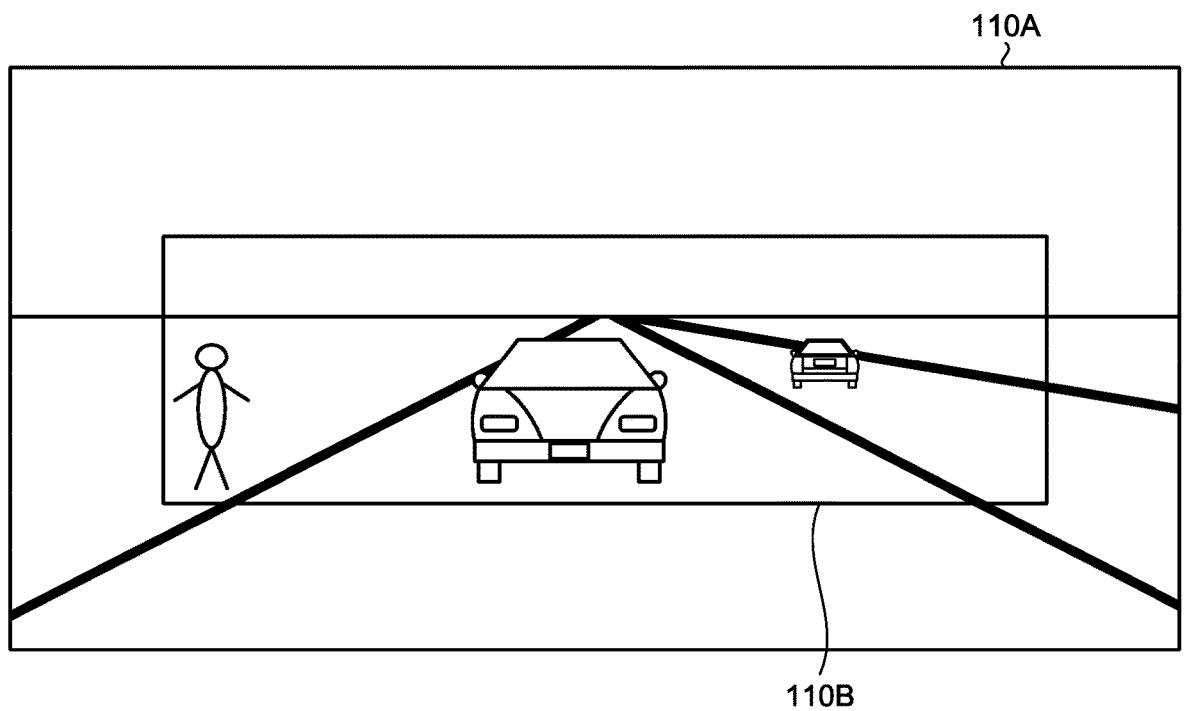
FIG. 32 is a diagram illustrating an example of the video data captured by the rear camera of the vehicular display system according to the 11th embodiment.
Figure 33:
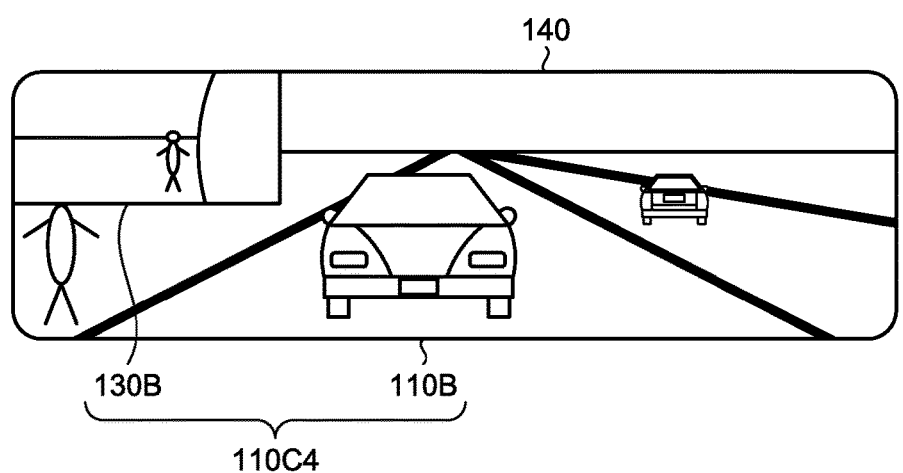
FIG. 33 is a diagram illustrating an example of the video displayed in the rearview monitor of the vehicular display system according to the 11th embodiment.

Explained below with reference to FIGS. 31 to 33 is the vehicular display system 1A according to an 11th embodiment. FIG. 31 is a flowchart for explaining a flow of processes performed in the controller of the vehicular display control device of the vehicular display system according to the 11th embodiment. FIG. 32 is a diagram illustrating an example of the video data captured by the rear camera of the vehicular display system according to the 11th embodiment. FIG. 33 is a diagram illustrating an example of the video displayed in the rearview monitor of the vehicular display system according to the 11th embodiment. In the vehicular display system 1A according to the 11th embodiment, the information processing performed in the controller 30A is different from the information processing performed in the vehicular display system 1A according to the seventh embodiment.

The travelling state information acquiring unit 60A acquires information related to a travelling path of the vehicle 100 as information indicating the travelling state of the vehicle 100. More specifically, the travelling state information acquiring unit 60A acquires the information related to the travelling path from navigation information or an external server. In the 11th embodiment, the travelling state information acquiring unit 60A acquires the number of traffic lanes on the road in which the vehicle 100 is travelling.

If the road information acquired by the travelling state information acquiring unit 60A indicates a two-lane road, then the video synthesizing unit 52A synthesizes either the rear right-side video data 120B or the rear left-side video data 130B, which corresponds to a road shoulder direction, in the upper portion on the right-side or the left-side of the rear video data 110B. More specifically, when the road shoulder direction is the left-side, the rear left-side video data 130B is synthesized in the upper portion on the left-side of the rear video data 110B. Similarly, when the road shoulder direction is the right-side, the rear right-side video data 120B is synthesized in the upper portion on the right-side of the rear video data 110B.

The following explanation is given about the information processing performed in the controller 30A. With reference to the flowchart illustrated in FIG. 31, the processes performed at Steps SA53, SA55, and SA56 are identical to the processes performed at Steps SA13, SA15, and SA16, respectively, illustrated in the flowchart in FIG. 17.

The controller 30A determines whether or not the travelling path is a two-lane road (Step SA51). More specifically, the controller 30A determines whether or not the travelling state acquired by the travelling state information acquiring unit 60A indicates that the travelling path of the vehicle 100 is a two-lane road. If it is determined that the travelling path is not a two-lane road (No at Step SA51), then the controller 30A again performs the process at Step SA51. When it is determined that the travelling path is a two-lane road (Yes at Step SA51), the system control proceeds to Step SA52.

The controller 30A generates rear video data 110C4 in which either the rear right-side video data 120B or the rear left-side video data 130B corresponding to the road shoulder direction (Step SA52) is synthesized. More specifically, the controller 30A uses the video synthesizing unit 52A to generate the rear video data 110C4 in which either the rear right-side video data 120B or the rear left-side video data 130B is synthesized in the upper portion on the side corresponding to the road shoulder direction.

Even after it is determined at Step SA51 that the travelling path is a two-lane road, the travelling state information acquiring unit 60A continues acquiring the travelling state. More specifically, the controller 30A continues acquiring the travelling state using the travelling state information acquiring unit 60A.

At Step SA53, during a period in which the synthesized rear video data 110C4 is displayed, the controller 30A determines whether or not the two-lane road has ended (Step SA54) based on the travelling state information acquired by the travelling state information acquiring unit 60A. If it is determined that the two-lane road has not ended (No at Step SA54), then the controller 30A continues displaying the synthesized rear video data 110C4. When it is determined that the two-lane road has ended (Yes at Step SA54), the controller 30A generates the rear video data 110B (Step SA55) and displays the rear video data 110B (Step SA56). That is, at Steps SA55 and SA56, the display of the usual rear video data 110B is started and continued to be displayed like a state before the determination at Step SA51 that the travelling path is a two-lane road.

Explained below with reference to FIGS. 32 and 33 is a specific example of the information processing performed in the controller 30A. The first-type video data 110A illustrated in FIG. 32 represents a video acquired when the vehicle 100 is travelling on a two-lane road. At Step SA51, the controller 30A determines that the travelling path is a two-lane road (Yes at Step SA51). Then, at Step SA52, the controller 30A synthesizes the rear left-side video data 130B in the left upper portion of the rear video data 110B that corresponds to the road shoulder direction to generate the rear video data 110C4. Subsequently, the controller 30A displays, in the display screen of the rearview monitor 140, the rear video data 110C4 in which the rear left-side video data 130B is synthesized as illustrated in FIG. 33.

In this way, in the vehicular display system 1A, at the time of travelling on a two-lane road, either the rear right-side video data 120B or the rear left-side video data 130B, which corresponds to the road shoulder direction, is synthesized in the upper portion on the right-side or the left-side in the rear video data 110B.

As described above, in the 11th embodiment, at the time of travelling on a two-lane road, the rear video data 110C4 in which the rear right-side video data 120B or the rear left-side video data 130B, which corresponds to the road shoulder direction, is synthesized in the upper portion on the right-side or the left-side in the rear video data 110B is displayed in the display screen of the rearview monitor 140. As a result, according to the 11th embodiment, at the time of travelling on a two-lane road, the rear portion of the vehicle 100 as well as the rear side portion for the road shoulder direction of the vehicle 100 can be checked in the display screen of the rearview monitor 140. Thus, in the 11th embodiment, it becomes possible to suppress the movement of the line of sight of the driver. Thus, according to the 11th embodiment, it becomes possible to shorten the time required by the driver to check the rear portion and the rear side portion. In this way, the vehicular display system 1A enables appropriate checking of the surroundings of the vehicle 100.

12th Embodiment

Figure 34:
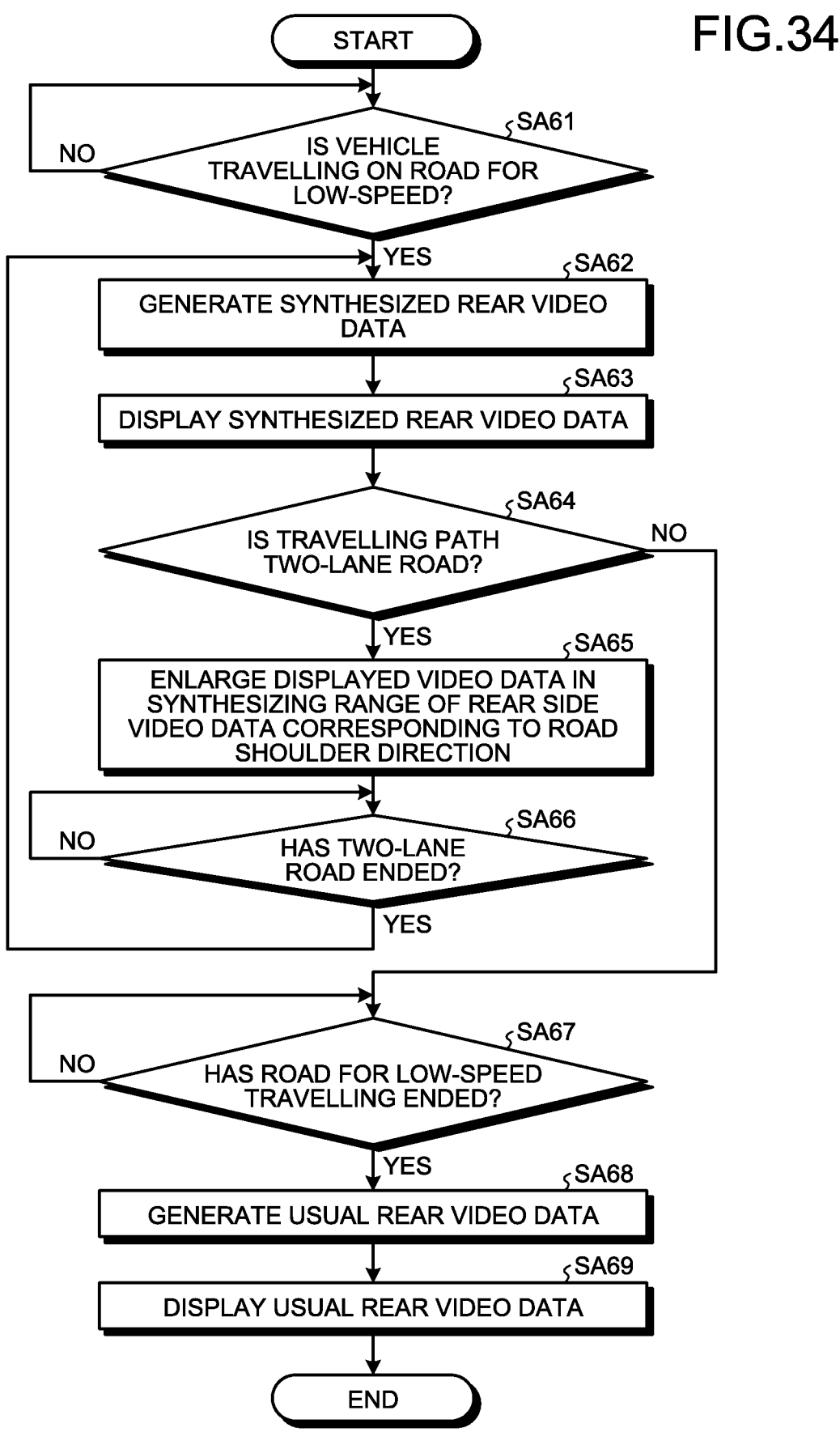
FIG. 34 is the flowchart for explaining the flow of processes performed in the controller of the vehicular display control device in the vehicular display system according to a 12th embodiment.
Figure 35:
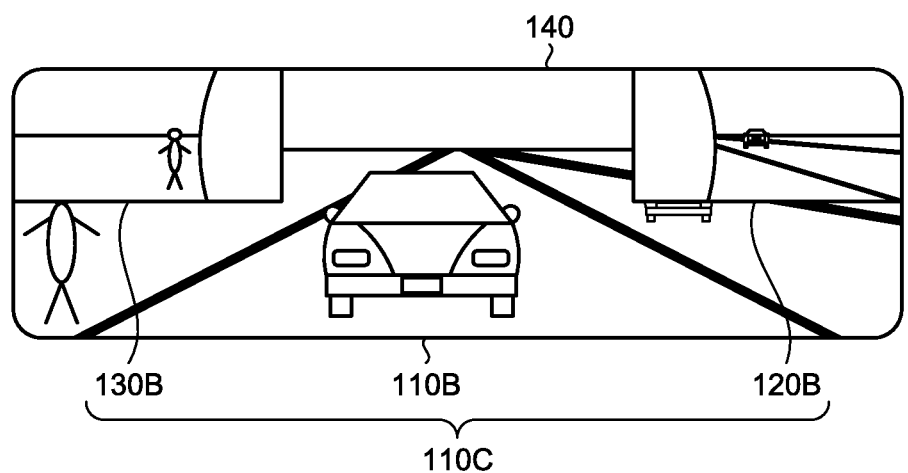
FIG. 35 is a diagram illustrating an example of the video displayed in the rearview monitor of the vehicular display system according to the 12th embodiment.
Figure 36:
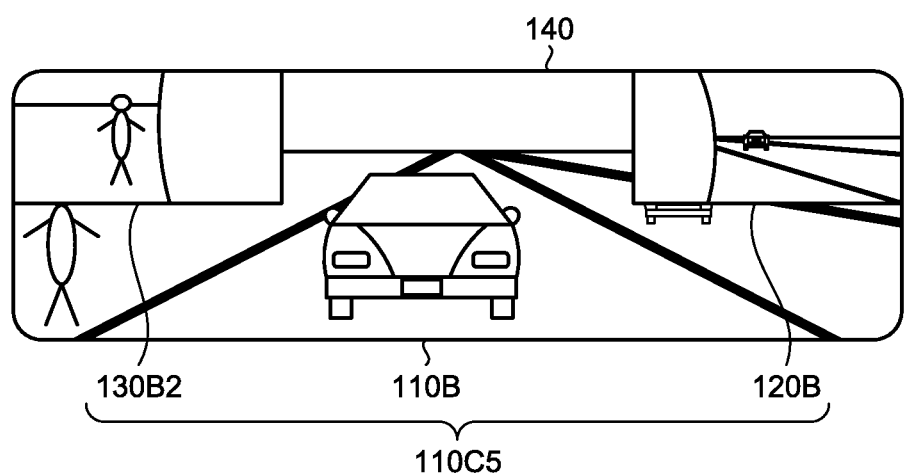
FIG. 36 is a diagram illustrating another example of the video displayed in the rearview monitor of the vehicular display system according to the 12th embodiment.

Explained below with reference to FIGS. 34 to 36 is the vehicular display system 1A according to a 12th embodiment. FIG. 34 is a flowchart for explaining a flow of processes performed in the controller of the vehicular display control device in the vehicular display system according to the 12th embodiment. FIG. 35 is a diagram illustrating an example of the video displayed in the rearview monitor of the vehicular display system according to the 12th embodiment. FIG. 36 is a diagram illustrating another example of the video displayed in the rearview monitor of the vehicular display system according to the 12th embodiment. In the vehicular display system 1A according to the 12th embodiment, the information processing performed in the controller 30A is different from the vehicular display system 1A according to the seventh embodiment.

The travelling state information acquiring unit 60A acquires information related to a travelling path of the vehicle 100 as information indicating the travelling state of the vehicle 100. More specifically, for example, based on navigation information or information acquired from an external server, the travelling state information acquiring unit 60A acquires the information enabling determination of whether or not the vehicle 100 is travelling on a road for low-speed travelling. Herein, a road for low-speed travelling implies that the travelling path goes through an urban area, a residential area, a shopping area, or a road with a number of pedestrians. Alternatively, a road for low-speed travelling can be a road the width of which is shorter than a predetermined width. Still alternatively, a road for low-speed travelling can be a road of a single traffic lane. Still alternatively, a road for low-speed travelling can be a road determined to be a two-lane road.

When the travelling state information acquiring unit 60A acquires information indicating that the vehicle 100 is travelling on a road for low-speed travelling, the video synthesizing unit 52A synthesizes the rear right-side video data 120B and the rear left-side video data 130B in the upper portion on the right-side and the left-side of the rear video data 110B respectively. Moreover, when the road information acquired by the travelling state information acquiring unit 60A indicates a two-lane road, the video synthesizing unit 52A enlarges either the rear right-side video data 120B or the rear left-side video data 130B corresponding to the road shoulder direction and synthesizes the enlarged video data. More specifically, when the road shoulder direction is the left-side, the video synthesizing unit 52A enlarges and synthesizes the rear left-side video data 130B in the left upper portion of the rear video data 110B. Similarly, when the road shoulder direction is the right-side, the video synthesizing unit 52A enlarges and synthesizes the rear right-side video data 120B in the right upper portion of the rear video data 110B.

The following explanation is given about the information processing performed in the controller 30A. With reference to the flowchart illustrated in FIG. 34, the processes performed at Steps SA62, SA63, SA68, and SA69 are identical to the processes performed at Steps SA12, SA13, SA15, and SA16, respectively, illustrated in the flowchart in FIG. 17. Moreover, with reference to the flowchart illustrated in FIG. 34, the processes performed at Steps SA64 and SA66 are identical to the processes performed at Steps SA51 and SA54, respectively, illustrated in the flowchart in FIG. 31.

The controller 30A determines whether or not the vehicle 100 is travelling on a road for low-speed travelling (Step SA61). More specifically, the controller 30A determines whether or not the travelling state acquired by the travelling state information acquiring unit 60A indicates that the vehicle 100 is travelling on a road for low-speed travelling. If it is determined that the vehicle 100 is not travelling on a road for low-speed travelling (No at Step SA61), then the controller 30A again performs the process at Step SA61. When it is determined that the vehicle 100 is travelling on a road for low-speed travelling (Yes at Step SA61), the system control proceeds to Step SA62.

At Step SA64, if it is determined that the travelling path is a two-lane road, then the controller 30A enlarges the displayed video data in the synthesizing range of either the rear right-side video data 120B or the rear left-side video data 130B corresponding to the road shoulder direction (Step SA65). More specifically, the controller 30A uses the video synthesizing unit 52A to generate synthesized rear video data 110C5 by enlarging either the rear right-side video data 120B or the rear left-side video data 130B corresponding to the road shoulder direction in the synthesized rear video data 110C generated at Step SA62. In the process of enlarging the displayed video, the clipping range by the clipping unit 51 is narrowed, and the narrowly-clipped rear right-side video data 120B or the narrowly-clipped rear left-side video data 130B is displayed in an enlarged manner.

Given below is the explanation of a specific example of the information processing performed in the controller 30A. At Step SA61, if it is determined that the vehicle 100 is not travelling on a road for low-speed travelling (No at Step SA61), then the controller 30A continues generating and displaying the usual rear video data 110B. On the other hand, at Step SA61, if it is determined that the vehicle 100 is travelling on a road for low-speed travelling (Yes at Step SA61), the controller 30A generates the synthesized rear video data 110C at Step SA62. More specifically, the controller 30A synthesizes the rear right-side video data 120B and the rear left-side video data 130B in the upper portion on the right-side and the left-side of the rear video data 110B illustrated in FIG. 35 respectively, and generates the synthesized rear video data 110C. Moreover, at Step SA64, if it is determined that the travelling path is a two-lane road (Yes at Step SA64), then, at Step SA65, the controller 30A generates the synthesized rear video data 110C5 by enlarging the rear right-side video data 120B or the rear left-side video data 130B corresponding to the road shoulder direction. More specifically, the controller 30A generates the rear video data 110C5 that contains the rear left-side video data 130B2 which is generated by enlarging the rear left-side video data 130B corresponding to the road shoulder direction as illustrated in FIG. 36. Then, the controller 30A displays either the usual rear video data 110B, or the synthesized rear video data 110C, or the synthesized rear video data 110C5 in the display screen of the rearview monitor 140.

In this way, in the vehicular display system 1A, when the vehicle 100 is travelling on a road meant for low-speed travelling, the rear right-side video data 120B and the rear left-side video data 130B are synthesized in the upper portion on the right-side and the left-side of the rear video data 110B respectively. Moreover, in the vehicular display system 1A, when the travelling path is a two-lane road, either the rear right-side video data 120B or the rear left-side video data 130B corresponding to the road shoulder direction is enlarged.

As described above, according to the 12th embodiment, when the vehicle 100 is travelling on a road for low-speed travelling, the rear portion of the vehicle 100 as well as the rear side portion for the road shoulder direction of the vehicle 100 can be checked in the display screen of the rearview monitor 140. Moreover, when the travelling path is a two-lane road, the synthesized rear video data 110C5 in which the rear right-side video data 120B or the rear left-side video data 130B corresponding to the road shoulder direction is enlarged is displayed in the display screen of the rearview monitor 140. Thus, according to the 12th embodiment, when the travelling path is a two-lane road, obstacles present on the right-side portion and the left-side portion of the vehicle 100 can be easily checked in the display screen of the rearview monitor 140. Thus, according to the 12th embodiment, it becomes possible to shorten the time required by the driver to check the rear portion and the rear side portions. In this way, the vehicular display system 1A enables appropriate checking of the surroundings of the vehicle 100.

13th Embodiment

Figure 37:
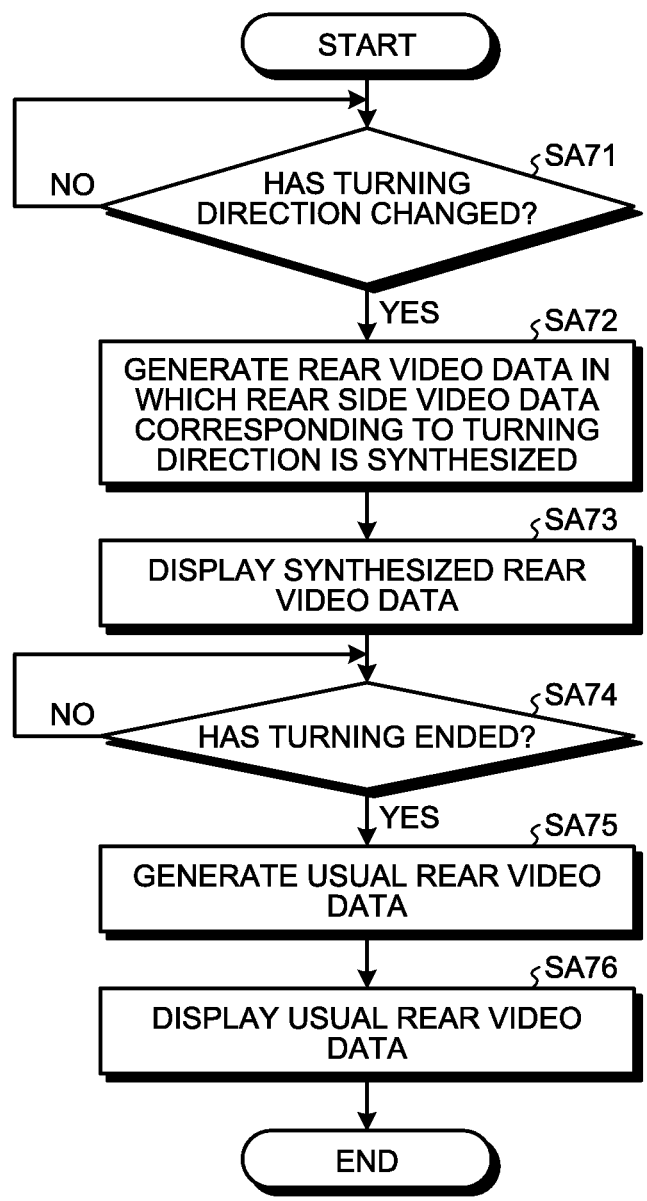
FIG. 37 is the flowchart for explaining the flow of processes performed in the controller of the vehicular display control device of the vehicular display system according to a 13th embodiment.

Explained below with reference to FIG. 37 is the vehicular display system 1A according to a 13th embodiment. FIG.

37 is a flowchart for explaining a flow of processes performed in the controller of the vehicular display control device of the vehicular display system according to the 13th embodiment. In the vehicular display system 1A according to the 13th embodiment, the information processing performed in the controller 30A is different from the vehicular display system 1A according to the seventh embodiment.

The travelling state information acquiring unit 60A acquires turning direction (left-right direction) information of the vehicle 100 as information indicating a travelling state of the vehicle 100. Herein, the turning direction information represents information for estimating movement of the vehicle in a turning direction. More particularly, the turning direction information represents at least either one of the following information: map information of the surroundings of the vehicle 100; current location information of the vehicle 100; blinker operation information of the vehicle 100; gear operation information of the vehicle 100; steering operation information of the vehicle 100; and angular velocity of the vehicle 100.

Herein, a change in the turning direction of the vehicle 100 implies a change away from the direction of extension of the road in which the vehicle 100 is travelling (hereinafter, called "travelling path direction"). Moreover, a change in the turning direction implies a change in the left or right direction of the vehicle 100 toward the travelling direction. For example, at a left turn or a right turn, or at a change of the traffic lane, the vehicle 100 generates a change in the turning direction. However, a change in the turning direction of the vehicle 100 does not include a change in the travelling direction of the vehicle 100 along a bend or a curve of the road.

When the turning direction information acquired by the travelling state information acquiring unit 60A indicates a change in the turning direction, the video synthesizing unit 52A synthesizes either the rear right-side video data 120B or the rear left-side video data 130B corresponding to the changed turning direction. More specifically, when the turning direction is the left-side direction, the video synthesizing unit 52A synthesizes the rear left-side video data 130B in the left upper portion of the rear video data 110B. For example, when the misalignment with the travelling path direction becomes equal to or greater than 15°, the video synthesizing unit 52A can determine that the turning direction has changed for ensuring that a certain amount of wobbling of the vehicle 100 or a certain amount of allowance in the steering wheel is not determined as a change in the turning direction of the vehicle 100.

The following explanation is given about the information processing performed in the controller 30A. With reference to the flowchart illustrated in FIG. 37, the processes performed at Steps SA73, SA75, and SA76 are identical to the processes performed at Steps SA13, SA15, and SA16, respectively, illustrated in the flowchart in FIG. 17.

The controller 30A determines whether or not the turning direction has changed (Step SA71). More specifically, the controller 30A determines whether or not the travelling state acquired by the travelling state information acquiring unit 60A indicates a change in the turning direction. If it is determined that the turning direction has not changed (No at Step SA71), then the controller 30A again performs the process at Step SA71. When it is determined that the turning direction has changed (Yes at Step SA71), the system control proceeds to Step SA72.

The controller 30A generates the rear video data 110C in which either the rear right-side video data 120B or the rear left-side video data 130B corresponding to the turning direction (Step SA72) is synthesized. More specifically, the controller 30A makes the video synthesizing unit 52A generate the rear video data 110C by synthesizing either the rear right-side video data 120B or the rear left-side video data 130B in the upper portion on the right-side or the left-side corresponding to the turning direction in the rear video data 110B.

Even after it is determined at Step SA71 that the turning direction has changed, the travelling state information acquiring unit 60A continues acquiring the travelling state. More specifically, the controller 30A continues acquiring the travelling state using the travelling state information acquiring unit 60A.

At Step SA73, during the period in which the synthesized rear video data 110C is displayed, the controller 30A determines end of the change in the turning direction based on the travelling state information acquired by the travelling state information acquiring unit 60A (Step SA74). If it is determined that the change in the turning direction has not ended (No at Step SA74), then the controller 30A continues displaying the synthesized rear video data 110C. On the other hand, if it is determined that the change in the turning direction has ended (Yes at Step SA74), then the controller 30A generates the rear video data 110B (Step SA75) and displays the rear video data 110B (Step SA76). That is, at Steps SA75 and SA76, the display of the usual rear video data 110B is started and continued to be displayed like a state before the determination at Step SA71 that the turning direction has changed.

In this way, in the vehicular display system 1A, when the turning direction changes, either the rear right-side video data 120B or the rear left-side video data 130B corresponding to the turning direction is synthesized in the upper portion on the right-side or the left-side of the rear video data 110B.

As described above, in the 13th embodiment, when the turning direction has changed, the rear video data 110C generated by synthesizing either the rear right-side video data 120B or the rear left-side video data 130B corresponding to the turning direction is displayed in the display screen of the rearview monitor 140. As a result, according to the 13th embodiment, when there is a change in the turning direction, the rear portion of the vehicle 100 as well as the rear side portion for the turning direction of the vehicle 100 can be checked. Thus, according to the 13th embodiment, it becomes possible to suppress the movement of the line of sight of the driver. Thus, according to the 13th embodiment, it becomes possible to shorten the time required by the driver to check the rear portion and the rear side portion. In this way, the vehicular display system 1A enables appropriate checking of the surroundings of the vehicle 100.

The constituent elements of the vehicular display system 1 illustrated in the drawings are merely conceptual, and need not be physically configured as illustrated. That is, the specific configurations of the constituent elements are not limited to the illustrated configurations and the constituent elements, as a whole or in part, can be separated or integrated either functionally or physically based on various types of loads or use condition.

For example, the configuration of the vehicular display system 1 can be implemented using a program as software loaded in a memory. In the embodiments described above, the explanation is given about the functional blocks implemented using cooperation of hardware and software. That is, the functional blocks can be implemented in various forms using either only hardware, or only software, or a combination of hardware and software.

The constituent elements described above include constituent elements that may easily occur to one skilled in the art and include equivalent constituent elements. Moreover, the constituent elements described above can be appropriately combined. Furthermore, the present application is to be construed as embodying various deletions, alternative constructions, and modifications that may occur to one skilled in the art that fairly fall within the basic teaching herein set forth.

The approaching vehicle detecting unit 60 can detect another vehicle coming close to the vehicle 100 or can detect the distance between the vehicle 100 and another vehicle using the distance between the vehicle 100 and another vehicle measured by a radar (not illustrated).

Meanwhile, for example, when the determination condition at Step S11 illustrated in the flowchart in FIG. 9 is satisfied for a certain period of time, the controller 30 can generate the synthesized rear video data 110C at Step S12. As a result, in the vehicular display system 1, it becomes possible to prevent a situation in which the video displayed in the rearview monitor 140 is changed unexpectedly.

Moreover, for example, when the determination condition at Step SA11 illustrated in the flowchart in FIG. 17 is satisfied for a certain period of time, the controller 30A can generate the synthesized rear video data 110C at Step SA12. As a result, in the vehicular display system 1A, it becomes possible to prevent a situation in which the video displayed in the rearview monitor 140 is changed unexpectedly.

The controller 30 can display, in the synthesized rear video data 110C, the ranges corresponding to the rear right-side video data 120B and the rear left-side video data 130B with a translucent color having a predetermined degree of transparency. As a result, in the vehicular display system 1, it becomes possible to easily confirm that the display in the rearview monitor 140 includes the rear right-side video data 120B and the rear left-side video data 130B.

The clipping unit 51 clips some portion of the first-type video data 110A. However, that is not the only possible case. Alternatively, instead of clipping the first-type video data 110A, the entire range thereof can be used as the rear video data 110B.

The clipping unit 51 clips, in the second-type video data, the rear right-side video data 120B and the rear left-side video data 130B for the right sideview monitor 150 and the left sideview monitor 160, respectively. However, that is not the only possible case. Alternatively, instead of clipping the second-type video data, the entire range thereof can be used as the rear right-side video data 120B and the rear left-side video data 130B.

Although the right sideview monitor 150 and the left sideview monitor 160 are installed, it is alternatively possible to use a conventional optical right sideview mirror and a conventional optical left sideview mirror.

The rear right-side video data 120B and the rear left-side video data 130B, which are synthesized in the upper portion on the right-side and the left-side of the rear video data 110B respectively, can have a different clipping range than the rear right-side video data and the rear left-side video data displayed in the right sideview monitor 150 and the left sideview monitor 160 respectively (hereinafter, called "sideview monitor videos"). For example, for the rear right-side video data 120B and the rear left-side video data 130B, the same range as the sideview monitor videos can be clipped. Alternatively, for example, for the rear right-side video data 120B and the rear left-side video data 130B, a wider range than the sideview monitor videos can be clipped. Still alternatively, for the rear right-side video data 120B and the rear left-side video data 130B, a narrower range than the sideview monitor videos can be clipped. In that case, in the rear right-side video data 120B and the rear left-side video data 130B that are synthesized in the upper portion on the right-side and the left-side of the rear video data 110B respectively, a narrower range than the sideview monitor videos can be displayed in an enlarged manner. Moreover, the rear right-side video data 120B and the rear left-side video data 130B that are synthesized in the upper portion on the right-side and the left-side of the rear video data 110B respectively can be set in such a way that sizes of subjects in the rear right-side video data 120B and the rear left-side video data 130B coincide with sizes of the subjects in the rear video data 110B.

The clipping range by the clipping unit 51 and the size of the rear right-side video data 120B or the rear left-side video data 130B in the display screen of the rearview monitor 140 can be adjustable by the driver while the vehicle 100 is parked. At that time, for example, the driver can adjust the clipping range or the display size to a desired size by performing an operation of narrowing or widening the distance between two fingers placed on the display screen of the rearview monitor 140. Alternatively, for example, the configuration can be such that, every time the display screen of the rearview monitor 140 is touched, the clipping range or the display size changes in a stepwise manner.

In the ninth embodiment, the detecting unit 80B performs pattern matching with respect to the rear video data 110B using the recognition dictionary stored in the recognition dictionary storage 300, and detects the presence of obstacles. However, the detection of the obstacle is not limited to that method. Alternatively, the detecting unit 80B can perform a road surface recognition process with respect to the rear video data 110B so as to recognize the road surface on the rear portion of the vehicle 100, and can recognize, as obstacles, the objects positioned above the detected road surface.

In the 11th and 12th embodiments, based on the road information acquired by the travelling state information acquiring unit 60A, it is determined whether or not the travelling path is a two-lane road. However, that is not the only possible case. Alternatively, the video synthesizing unit 52A can perform a traffic lane recognition process with respect to the first-type video data 110A, and can determine whether or not that the travelling path is a two-lane road.

In the eighth embodiment, at the time of clipping the rear video data 110B2 by shifting the clipping range to the lower side, it is also possible to clip the rear right-side video data 120B and the rear left-side video data 130B by shifting the clipping range to the lower side. Alternatively, at the time of clipping the rear video data 110B2 by shifting the clipping range to the lower side, the clipping range of either the rear right-side video data 120B or the rear left-side video data 130B corresponding to the turning direction of the vehicle 100 can be shifted to the lower side.

According to the present application, appropriate checking of surroundings of a vehicle can be made possible.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicular display control device comprising:
   a rear video data acquiring unit configured to acquire rear video data from a rear camera disposed to face a rear portion of a vehicle to capture a rear view of the vehicle;
   a rear side video data acquiring unit configured to acquire rear side video data from rear side cameras disposed on a right side and a left side, respectively, of the vehicle to face the rear portion of the vehicle, wherein the rear side vide data captures rear right-side video data and rear left-side video data of the vehicle;
   a state detecting unit configured to detect a surrounding state of the vehicle;
   a video synthesizing unit configured to, according to the surrounding state of the vehicle, synthesize the rear side video data in an upper portion of the rear video data on a right side and a left side of the rear video data to yield synthesized video data; and
   a display controller configured to display the synthesized video data in a display that displays the rear video data of the vehicle, wherein
   the state detecting unit is configured to detect at least one vehicle approaching the vehicle from behind and to detect a distance between the vehicle and the at least one vehicle approaching the vehicle from behind,
   the video synthesizing unit is further configured to synthesize the rear side video data in the upper portion on the right-side and the left-side of the rear video data which include no center portion thereof in response to detection by the state detecting unit that the at least one vehicle is approaching the vehicle from behind, and
   the video synthesizing unit is further configured to, in response to a determination that the distance between the vehicle and the at least one vehicle becomes shorter than a defined distance, synthesize either the rear right-side video data or the rear left-side video data corresponding to the at least one vehicle in an enlarged manner.

2. The vehicular display control device according to claim 1, wherein
   the state detecting unit is further configured to detect a relative velocity between the vehicle and the at least one vehicle, and
   the video synthesizing unit is further configured to synthesize the rear side video data in the upper portion of the rear video data on the right-side and the left-side of the rear video data in response to a determination that the relative velocity is equal to or greater than a defined level.

3. The vehicular display control device according to claim 1, wherein
   the state detecting unit is further configured to detect a first traffic lane in which the vehicle is travelling and to detect a second traffic lane in which the at least one vehicle is travelling, and
   the video synthesizing unit is further configured to, in response to a determination that the distance between the at least one vehicle travelling in the second traffic lane and the vehicle becomes shorter than a defined distance, synthesize either the rear right-side video data or the rear left-side video data corresponding to the second traffic lane in which the at least one vehicle is travelling in an enlarged manner.

4. The vehicular display control device according to claim 1, further comprising a travelling state information acquiring unit configured to acquire planned traffic lane change information of the vehicle,
   Wherein the video synthesizing unit is further configured to synthesize the rear side video data in the upper portion of the rear video data on the right-side and the left-side of the rear video data in response to a determination that the planned traffic lane change information indicates a change in a traffic lane of the vehicle.

5. The vehicular display control device according to claim 1, wherein
   the state detecting unit is further configured to acquire information indicating a travelling state of the vehicle, and
   the video synthesizing unit is further configured to synthesize the rear side video data in the upper portion on the right-side and the left-side of the rear video data according to the travelling state to yield synthesized rear video data.

6. The vehicular display control device according to claim 5, wherein
   the state detecting unit is further configured to acquire information indicating that the vehicle is moving backward, and
   the video synthesizing unit is further configured to synthesize the rear side video data in the upper portion of the rear video data on the right-side and the left-side of the rear video data in response to a determination that the information indicates that the vehicle is moving backward.

7. The vehicular display control device according to claim 6, further comprising a detecting unit configured to detect at least one obstacle on the side or the left side of the rear video data,
   wherein the video synthesizing unit is further configured to, in response to detection of the at least one obstacle by the detecting unit, synthesize either the rear right-side video data or the rear left-side video data corresponding to a direction of the at least one obstacle in an enlarged manner.

8. The vehicular display control device according to claim 5, further comprising a clipping unit configured to clip, in the rear video data, a display range to be displayed in the display,
   wherein the clipping unit clips the display range, while the synthesized rear video data is displayed in the display, on a lower side than a display range that is clipped in a case of displaying non-synthesized rear video data.

9. The vehicular display control device according to claim 5, wherein
   the state detecting unit is further configured to acquire information related to a travelling speed of the vehicle as the information indicating the travelling state of the vehicle, and
   the video synthesizing unit is further configured to synthesize the rear side video data in the upper portion of the rear video data on the right side and the left side of the rear video data in response to a determination that the information indicates that the vehicle is in a low-speed travelling state.

10. The vehicular display control device according to claim 5, wherein
    the state detecting unit is further configured to acquire information related to a travelling path of the vehicle as the information indicating the travelling state of the vehicle, and the video synthesizing unit is further configured to, in response to a determination that the information related to the travelling path indicates a two-lane road, synthesize either the rear right-side video data or the rear left-side video data corresponding to a road shoulder direction in the upper portion either on the right side or on the left side of the rear video data.

11. The vehicular display control device according to claim 5, wherein
the state detecting unit is further configured to acquire information indicating a travelling path of the vehicle as the information indicating the travelling state of the vehicle, and
the video synthesizing unit is further configured to synthesize the rear side video data in the upper portion on the right side and the left side of the rear video data in response to a determination that the information related to the travelling path indicates a road for low-speed travelling.

12. The vehicular display control device according to claim 11, wherein
the video synthesizing unit is further configured to, in response to a determination that the information indicating the travelling path indicates a two-lane road, synthesize either the rear right-side video data or the rear left-side video data corresponding to a road shoulder direction in the upper portion either on the right side or on the left side of the rear video data in an enlarged manner.

13. The vehicular display control device according to claim 5, wherein
the state detecting unit is further configured to acquire a turning direction information of the vehicle as the information indicating the travelling state of the vehicle, and
the video synthesizing unit is further configured to, in response to a determination that the turning direction information indicates a change in a turning direction, synthesize either the rear right-side video data or the rear left-side video data corresponding to the turning direction in the upper portion of the rear video data on either the right side or the left side of the rear video data.

14. A vehicular display system comprising:
the vehicular display control device according to claim 1; and
at least one of the display, the rear camera, or the rear side cameras.

15. A vehicular display control method comprising:
acquiring rear video data from a rear camera disposed to face a rear portion of a vehicle to capture a rear view of the vehicle;
acquiring rear side video data from rear side cameras disposed on a right side and a left side of the vehicle to face the rear portion of the vehicle, wherein the rear side video data captures a rear right-side view and a rear left-side view of the vehicle;
detecting a surrounding state of the vehicle;
synthesizing the rear side video data in an upper portion of the rear video data on a right side and a left side of the rear video data according to the surrounding state of the vehicle to yield synthesized video data; and
displaying the synthesized video data on a display that displays the rear video data,
wherein
the detecting comprises detecting at least one vehicle approaching the vehicle from behind and detecting a distance between the vehicle and the at least one vehicle, and
the synthesizing comprises:
synthesizing the rear side video data in the upper portion on the right side and the left side of the rear video data in response to detection of the at least one vehicle approaching the vehicle from behind, and
in response to a determination that the distance between the vehicle and the at least one vehicle becomes shorter than a defined distance, synthesizing either the rear right-side video data or the rear left-side video data corresponding to the at least one vehicle in an enlarged manner.

16. A non-transitory storage medium that stores a program that, in response to execution, causes a computer operating as a vehicular display control device to execute operations, the operations comprising:
acquiring rear video data from a rear camera oriented to face a rear portion of a first vehicle, wherein the rear video data captures a rear view of the first vehicle;
acquiring rear side video data from rear side cameras disposed on a right side and a left side, respectively, of the first vehicle to face the rear portion of the first vehicle, wherein the rear side video data captures a rear right-side view and a rear left-side view of the first vehicle;
detecting a surrounding state of the first vehicle;
synthesizing the rear side video data in an upper portion of the rear video data on a right side and a left side of the rear video data according to the surrounding state of the first vehicle to yield synthesized video data; and
displaying the synthesized video data in a display that displays the rear video data,
wherein
the detecting comprises detecting a second vehicle approaching the first vehicle from behind and determining a distance between the first vehicle and the second vehicle, and
the synthesizing comprises:
synthesizing the rear side video data in the upper portion of the rear video data on the right side and the left side of the rear video data in response to detecting that the second vehicle is approaching the first vehicle from behind, and
in response to determining that the distance between the first vehicle and second vehicle becomes shorter than a predetermined distance, synthesizing either the rear right-side video data or the rear left-side video data corresponding to the second vehicle in an enlarged manner.

* * * * *